(12) United States Patent
Watanabe

(10) Patent No.: US 7,669,933 B2
(45) Date of Patent: Mar. 2, 2010

(54) HEADREST MECHANISM

(75) Inventor: Eiji Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 276 days.

(21) Appl. No.: 11/798,957

(22) Filed: May 18, 2007

(65) Prior Publication Data
US 2007/0267908 A1 Nov. 22, 2007

(30) Foreign Application Priority Data
May 19, 2006 (JP) .............................. 2006-140410

(51) Int. Cl.
*B60N 2/48* (2006.01)
*A47C 7/38* (2006.01)
(52) U.S. Cl. ..................................................... 297/410
(58) Field of Classification Search ................. 403/318, 403/317; 297/391, 61, 410, 463.1
See application file for complete search history.

(56) References Cited
U.S. PATENT DOCUMENTS

| | | | | |
|---|---|---|---|---|
| 3,948,561 A | * | 4/1976 | de Rosa ...................... 297/391 |
| 4,695,095 A | * | 9/1987 | Faust et al. ................... 297/410 |
| 5,860,703 A | * | 1/1999 | Courtois et al. .............. 297/410 |
| 5,934,755 A | * | 8/1999 | Halamish ...................... 297/410 |
| 7,172,255 B2 | * | 2/2007 | Wanke ......................... 297/410 |
| 2006/0214492 A1 | * | 9/2006 | Hassler et al. ............... 297/410 |

FOREIGN PATENT DOCUMENTS

| | | |
|---|---|---|
| JP | 60-108241 | 7/1985 |
| JP | 03-072754 | 7/1991 |
| JP | 2005-52585 | 3/2005 |
| JP | 2005-255100 | 9/2005 |

* cited by examiner

*Primary Examiner*—Joseph F Edell
(74) *Attorney, Agent, or Firm*—Finnegan, Henderson, Farabow, Garrett & Dunner, LLP

(57) ABSTRACT

A headrest mechanism includes a headrest stay, a headrest support, an engagement member, a plurality of adjustment portions, and a pullout prevention portion. The height of a headrest may be adjusted by pushing the button portion of the headrest support to disengage the engagement member provided in the headrest support from an adjustment portions provided on the side surface of a headrest stay. The headrest, including the headrest stay, may be removed by turning a lock portion of the headrest support by 90 degrees, pushing the button portion and pulling up the headrest. Thus, the headrest can be removed without using any additional tools.

15 Claims, 25 Drawing Sheets

HEADREST MECHANISM

The disclosure of Japanese Patent Application No. 2006-140410, filed on May 19, 2006, including the specification, drawings and abstract is incorporated herein by reference in its entirety.

BACKGROUND OF THE INVENTION

1. Field of the Invention

The invention relates to a headrest mechanism.

2. Description of the Related Art

In a conventional headrest mechanism, a headrest stay provided in a headrest is inserted into, and pulled out of a headrest support. An engagement portion provided in the headrest support engages with, and disengages from one of a plurality of adjustment grooves formed on the side surface of the headrest stay. By appropriately determining the adjustment groove with which the engagement portion should engage, the height of the headrest is adjusted (i.e., the headrest stay is moved upward or downward).

Thus, when the engagement portion disengages from the adjustment groove (the lowest adjustment groove in most cases), the headrest stay can be pulled out, that is, the headrest can be removed.

Accordingly, a lock mechanism is provided to prevent the headrest stay from being pulled out. In addition, another mechanism is provided to unlock the lock mechanism using a special operating tool (for example, refer to Japanese Patent Application Publication No. 2005-52585 (JP-A-2005-52585)).

However, troublesome operation needs to be performed using a special operating tool when the headrest is removed or mounted.

SUMMARY OF THE INVENTION

The invention relates to a headrest mechanism in which a headrest stay can be pulled out without using any special equipment.

A first aspect of the invention relates to a headrest mechanism that includes a headrest stay, a headrest support, an engagement member, a plurality of adjustment portions, and a pullout prevention portion. The headrest stay is provided in a headrest. The height of the headrest is adjusted by moving the headrest stay. The headrest stay is inserted into, and pulled out of the headrest support. An adjustment operation and a pullout operation are performed using the headrest support. The engagement member is provided in the headrest support. The plurality of adjustment portions is provided in the headrest stay. Movement of the headrest stay is prevented by engagement of the engagement member with one of the plurality of adjustment portions. The engagement member disengages from the one of the plurality of adjustment portions when the adjustment operation is performed using the headrest support to allow the headrest stay to move. The pullout prevention portion is provided in the headrest stay. The headrest stay is prevented from being pulled out by engagement of the engagement member with the pullout prevention portion. The engagement of the engagement member with the pullout prevention portion is prohibited when the pullout operation is performed using the headrest support to allow the headrest stay to be pulled out.

In the headrest mechanism according to the first aspect, when the adjustment operation is performed using the headrest support, the engagement member disengages from the adjustment portion to allow the headrest stay to move. Thus, the height of the headrest can be adjusted. Also, the headrest stay is prevented from being pulled out by engagement of the engagement portion with the pullout prevention portion provided in the headrest stay.

However, when the pullout operation is performed using the headrest support, the engagement portion is prevented from engaging with the pullout prevention portion to allow the headrest stay to be pulled out.

Thus, by performing the pullout operation, the headrest stay can be pulled out. That is, the headrest stay can be pulled out without using any special equipment.

The headrest mechanism according to the second aspect of the invention is similar to that according to the first aspect, except that the pullout operation using the headrest support can only be performed when the height of the headrest is equal to a predetermined height.

In the headrest mechanism according to the second aspect, when the height of the headrest is equal to a predetermined height, the pullout operation can only be performed using the headrest support. This prevents the headrest stay from being easily pulled out.

The headrest mechanism according to the third aspect of the invention is similar to that according to the first aspect or the second aspect, except that there are two components to the pullout operation.

In the headrest mechanism according to the third aspect, when a first component and a second component of the pullout operation are performed, engagement of the engagement member with the pullout prevention portion is prevented, thus allowing the headrest stay to be pulled out. This prevents the headrest stay from being easily pulled out.

The headrest mechanism according to the fourth aspect of the invention is similar to that according to the third aspect, except the following points. The engagement member includes a first engagement portion and a second engagement portion. Movement of the headrest stay is prevented by engagement of the first engagement portion with one of the plurality of adjustment portions provided in the headrest stay. The headrest stay is prevented from being pulled out by engagement of the second engagement portion with the pullout prevention portion provided in the headrest stay. When the adjustment operation is performed using the headrest support, the first engagement portion disengages from the one of the adjustment portions to allow the headrest stay to move. When the first component of the pullout operation is performed using the headrest support, the second engagement portion disengages from the pullout prevention portion, and the first engagement portion engages with the pullout prevention portion. When the second component of the pullout operation is performed using the headrest support, the first engagement portion disengages from the pullout prevention portion to allow the headrest stay to be pulled out.

In the headrest mechanism according to the fourth aspect of the invention, when the first component is performed using the headrest support, the second engagement portion disengages from the pullout prevention portion, and the first engagement portion engages with the pullout prevention portion.

When the second component is performed after the first component is performed using the headrest support, the first engagement portion disengages from the pullout prevention portion to allow the headrest stay to be pulled out. This prevents the headrest stay from being easily pulled out.

The headrest mechanism according to the fifth aspect of the invention is similar to that according to the first or second aspect, except that the headrest support includes a pullout operation portion by which the pullout operation is performed, and a prevention portion that prevents the pullout operation from being performed using the pullout operation portion.

The headrest mechanism according to the fifth aspect includes the prevention portion that prevents the pullout operation from being performed using the pullout operation portion. This prevents the headrest stay from being easily pulled out.

The headrest mechanism according to the sixth aspect of the invention is similar to that according to the first or second aspect, except that the headrest support includes a movable portion that is moved in the pullout operation.

In the headrest mechanism according to the sixth aspect of the invention, by moving the movable portion in the pullout operation, the headrest stay can be pulled out.

A seventh aspect of the invention relates to a headrest mechanism that includes a headrest stay, a headrest support, engagement means, a plurality of adjustment portions, and a pullout prevention portion. The headrest stay is provided in a headrest. The height of the headrest is adjusted by moving the headrest stay. The headrest stay is inserted into, and pulled out of the headrest support. An adjustment operation and a pullout operation are performed using the headrest support. The engagement means is provided in the headrest support. The plurality of adjustment portions is provided in the headrest stay. Movement of the headrest stay is prevented by engagement of the engagement means with one of the plurality of adjustment portions. The engagement means disengages from the one of the plurality of adjustment portions when the adjustment operation is performed using the headrest support to allow the headrest stay to move. The pullout prevention portion is provided in the headrest stay. The headrest stay is prevented from being pulled out by engagement of the engagement means with the pullout prevention portion. The engagement of the engagement means with the pullout prevention portion is prohibited when the pullout operation is performed using the headrest support to allow the headrest stay to be pulled out.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 20A shows the headrest mechanism in which a second engagement portion may engage with a pullout prevention step, and FIG. 20B shows the headrest mechanism in which the lock portion of the headrest support is pulled up to prohibit engagement of the second engagement portion with the pullout prevention step;

FIG. 23A shows the headrest mechanism in which a second engagement portion engages with a pullout prevention step, and FIG. 23B shows the headrest mechanism in which the lock portion of the headrest support is slid, and the second engagement portion disengages from the pullout prevention step;

FIG. 25A shows the headrest mechanism in which a second engagement portion engages with a pullout prevention step, and FIG. 25B shows the headrest mechanism in which a button portion is slid, and the second engagement portion disengages from the pullout prevention step.

DETAILED DESCRIPTION OF THE EXAMPLE EMBODIMENTS

A headrest mechanism according to a first embodiment of the invention will be described.

Figure 1:
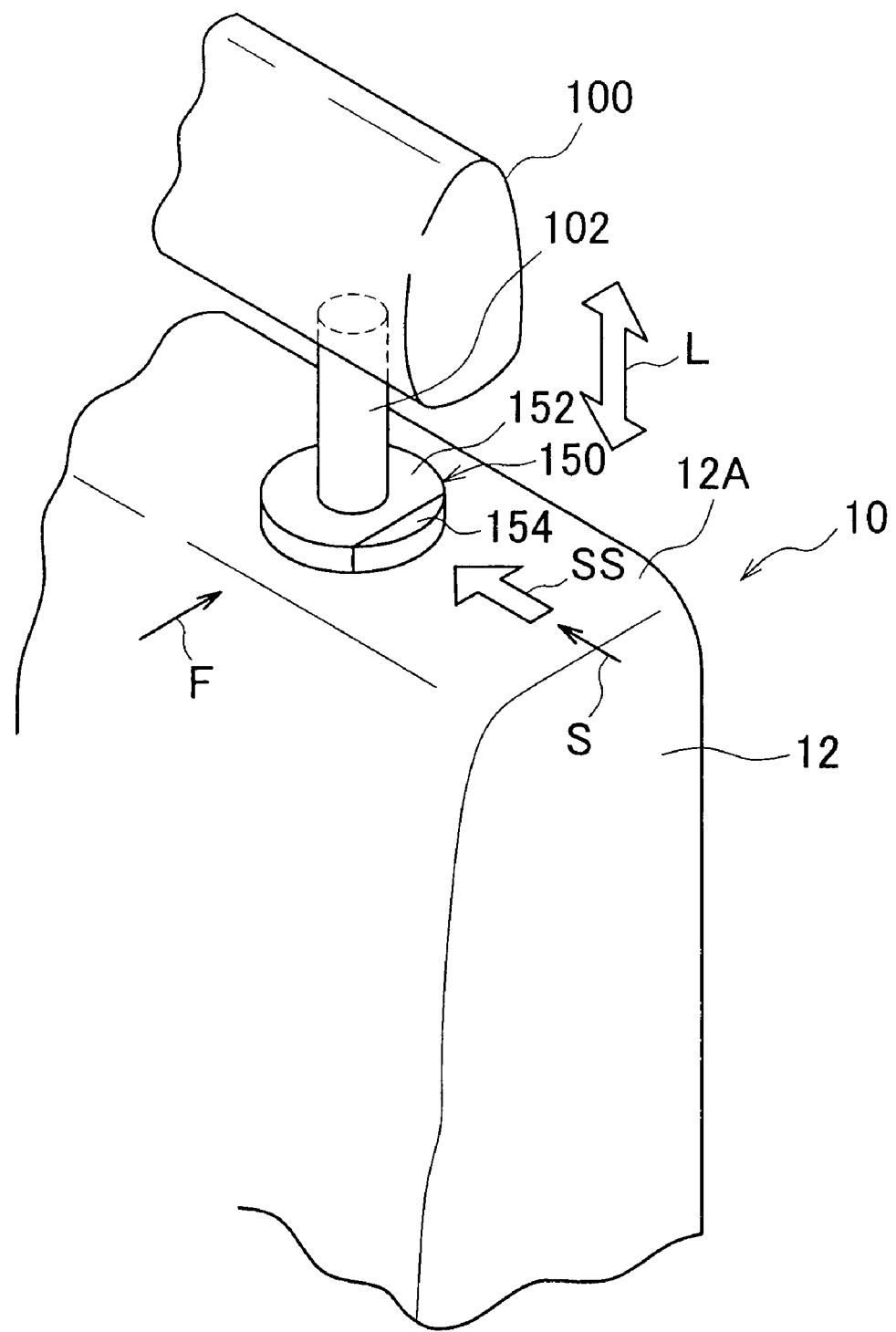
FIG. 1 is a diagram showing a headrest mechanism according to a first embodiment of the invention, and an adjustment operation for adjusting the height of a headrest.

As shown in FIG. 1, a seat 10 disposed in a vehicle cabin includes a seat cushion (not shown), a seat back 12, and a headrest 100. The seat cushion constitutes a seat portion on which an occupant sits. The seat back 12 constitutes a backrest portion. The headrest 100 is disposed above the seat back 12 to support the head of the occupant. Paired right and left headrest stays 102 are provided in the headrest 100. Each headrest stay 102 extends downward from the bottom portion of the headrest 100.

Figure 3:
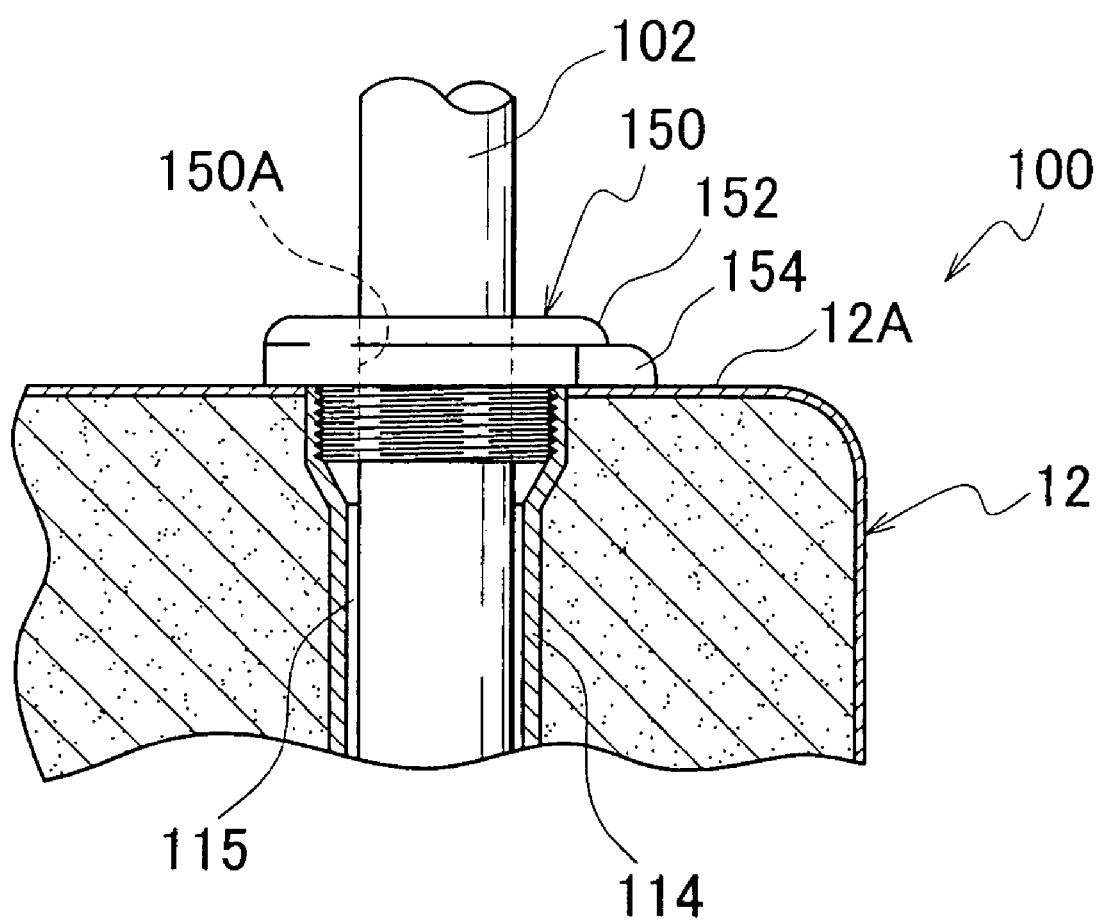
FIG. 3 is a lateral view showing the headrest mechanism according to the first embodiment of the invention.

As shown in FIG. 3, paired right and left headrest supports 150 are provided at the top end of the seat back 12. An opening is formed in the top portion of each headrest support 150. The headrest stays 102 are inserted into the respective headrest support 150 through the opening formed in each headrest support 150.

The paired right and left headrest stays 102 are provided in the direction of a seat width (i.e., the direction of the width of a vehicle body (hereinafter, this direction will be referred to as "a vehicle-body width direction")). The paired right and left headrest supports 150 are provided for the paired right and left headrest stays 102. Because the right and left headrest stays 102 have the same shape and the same structure, and the right and left headrest supports 150 have the same shape and the same structure, only one of the headrest stays 102 and one of the headrest supports 150 are shown in each drawing.

Figure 2:
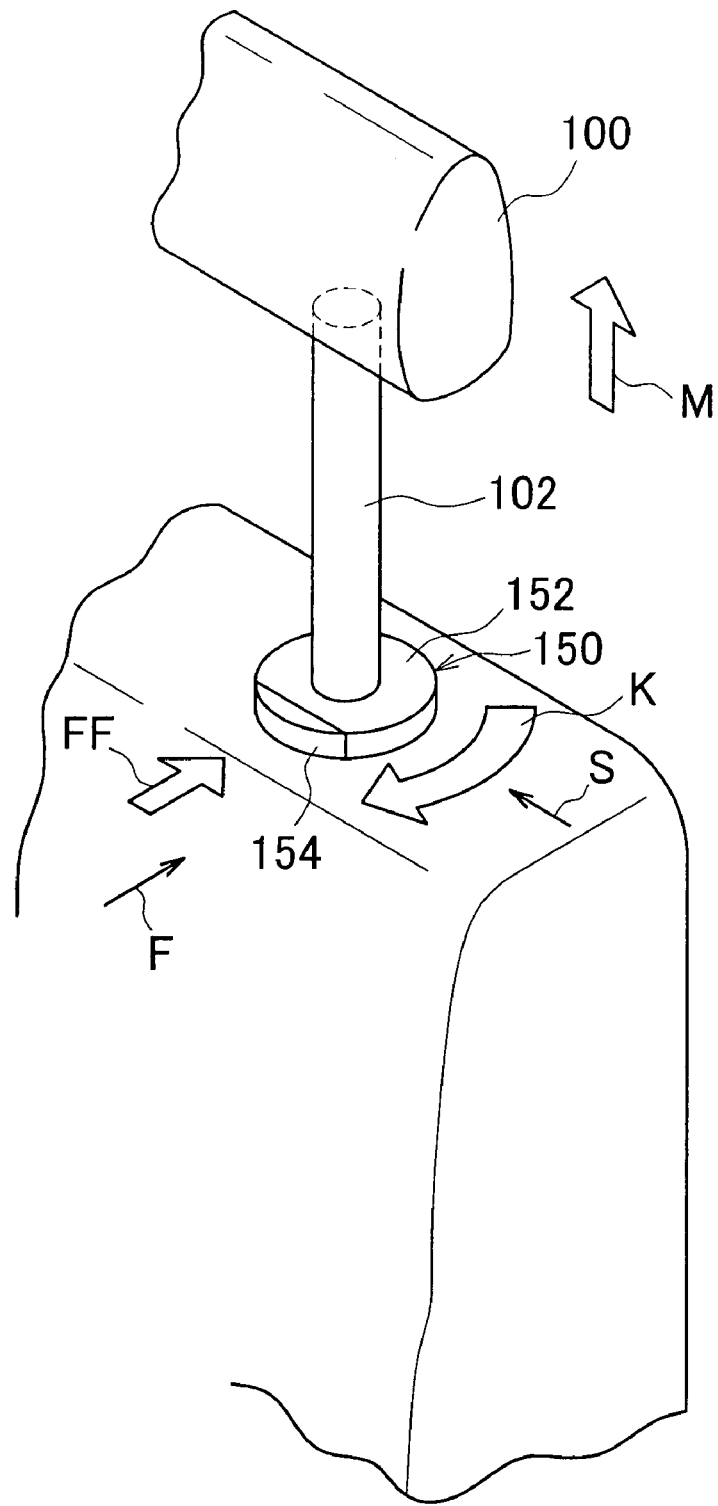
FIG. 2 is a diagram showing the headrest mechanism according to the first embodiment of the invention, and a pullout operation for pulling out a headrest stay to remove the headrest.

As shown in FIG. 1, in the headrest mechanism in this embodiment, a predetermined adjustment operation (described in detail later) is performed to adjust the height of the headrest 100 (i.e., the headrest 100 can be moved upward or downward) (refer to the arrow L in FIG. 1). Further, as shown in FIG. 2, only when a predetermined pullout operation (described in detail later) is performed, the headrest stay 102 can be pulled out of the seat back 12 (the headrest support 150), that is, the headrest 100 can be removed (refer to the arrow M in FIG. 2).

Figure 4:
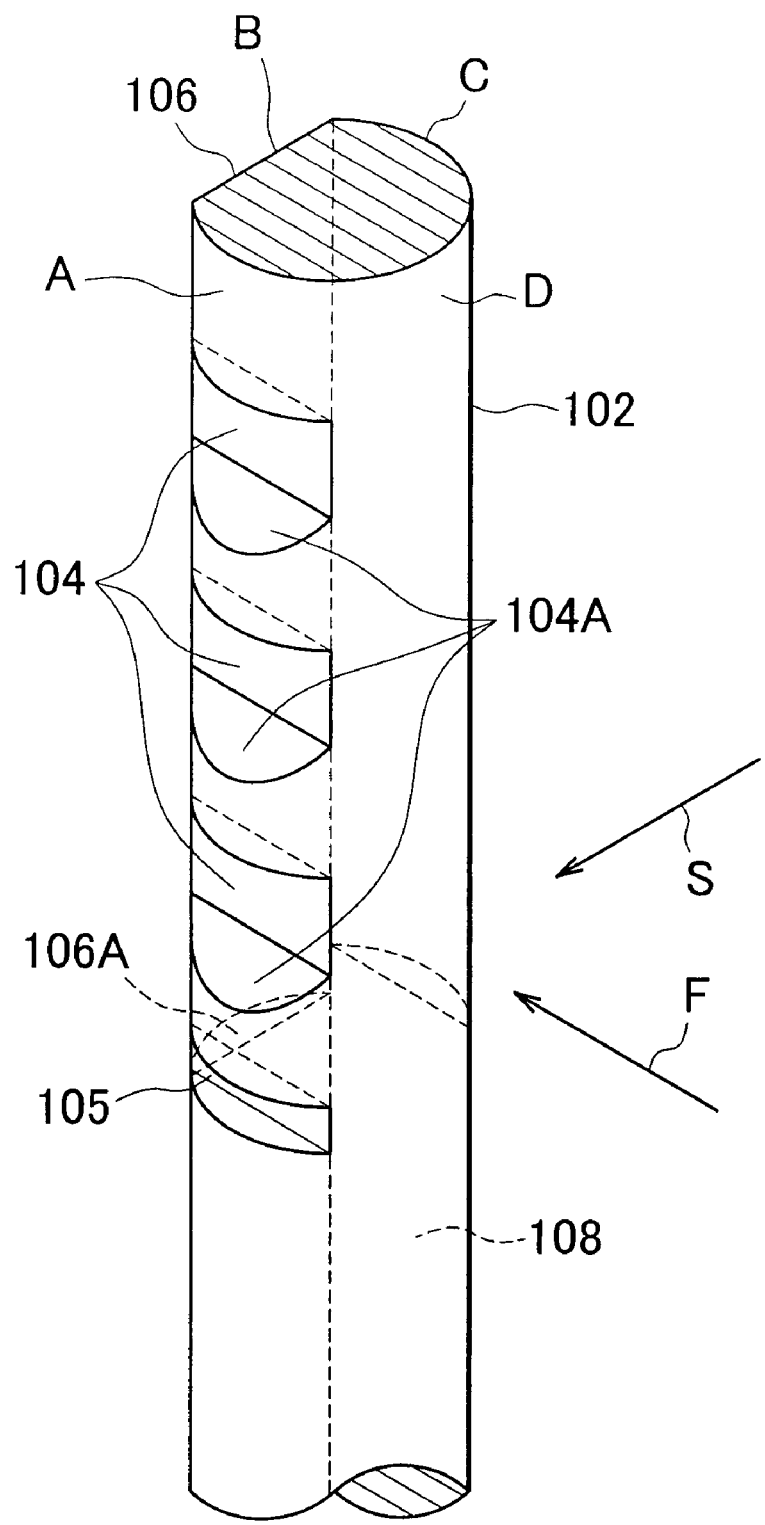
FIG. 4 is a perspective view showing the headrest stay of the headrest mechanism according to the first embodiment of the invention.
Figures 5A, 5B:
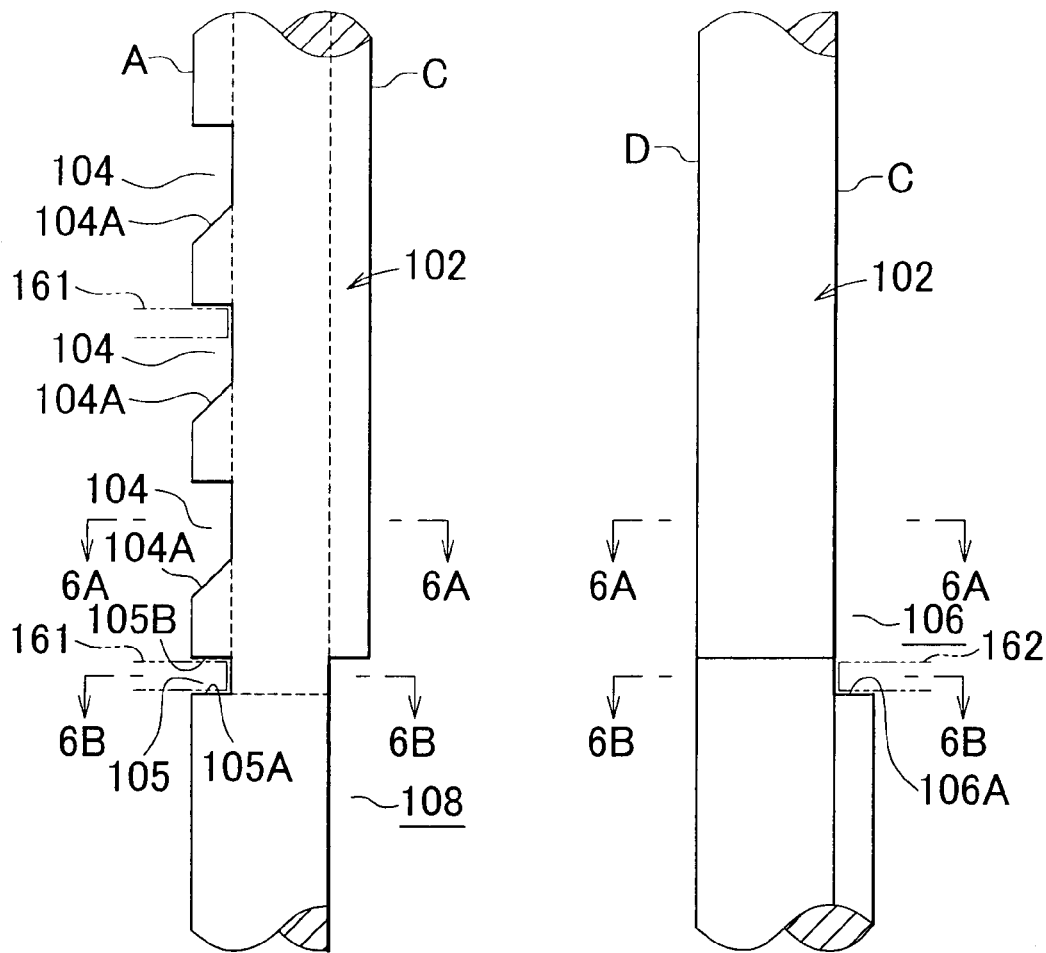
FIG. 5A is a front view showing the headrest stay of the headrest mechanism according to the first embodiment of the invention.
FIG. 5B is a lateral view showing the headrest stay of the headrest mechanism according to the first embodiment of the invention.
Figure 6A:
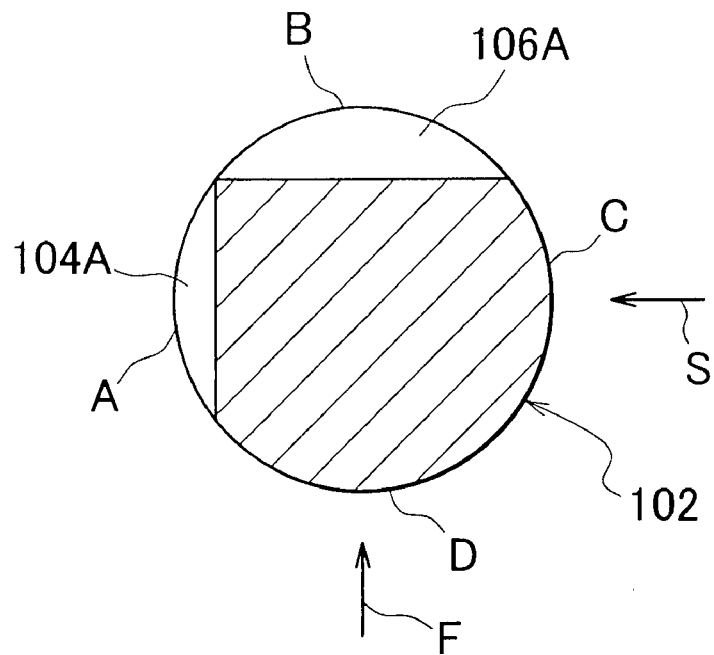
FIG. 6A is a cross sectional view taken along line 6A-6A in FIGS. 5A and 5B.
Figure 6B:
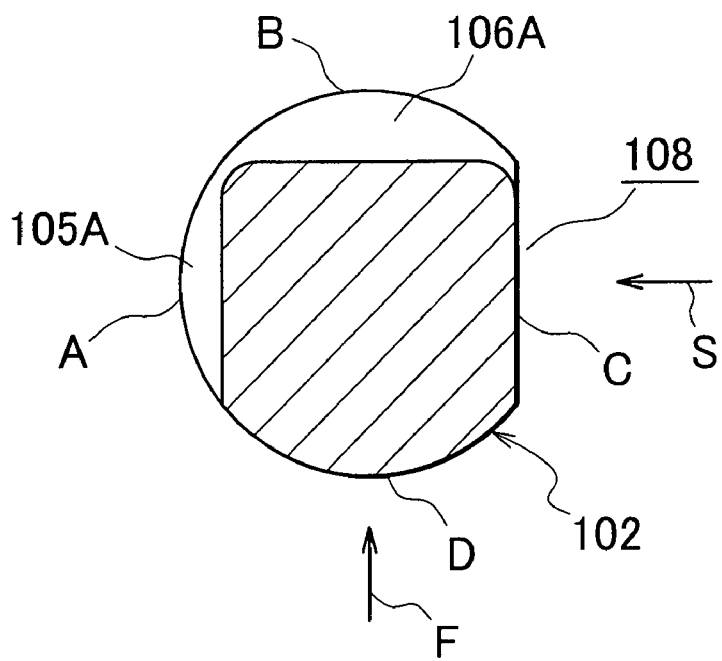
FIG. 6B is a cross sectional view taken along line 6B-6B in FIGS. 5A and 5B.

FIG. 4 is a perspective view showing the headrest stay 102. FIG. 5A is a front view of the headrest stay 102 viewed in the direction shown by the arrow F in FIG. 4 (i.e., the longitudinal direction of the vehicle body). FIG. 5B is a lateral view of the headrest stay 102 viewed in the direction shown by the arrow S in FIG. 4 (i.e., the direction from the outside to the inside in the vehicle-body width direction). FIG. 6A is a cross sectional view taken along line 6A-6A in FIGS. 5A and 5B. FIG. 6B is a cross sectional view taken along line 6B-6B in FIGS. 5A and 5B.

Figure 5C:
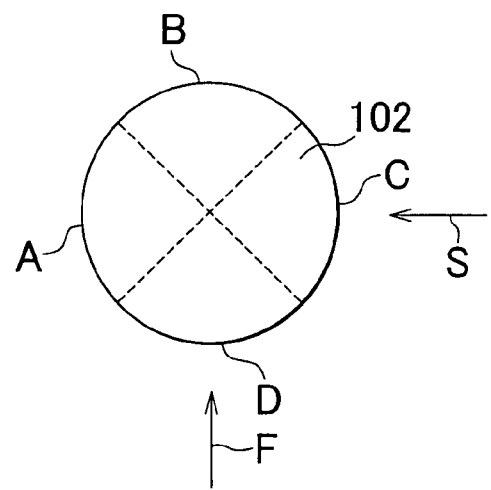
FIG. 5C is a diagram explaining each side surface of the headrest stay.

As shown in FIG. 5C, the headrest stay 102, as viewed from above, is divided into four sections. The side surface of one of the four sections, which is positioned on the left side when the headrest stay 102 is viewed in the direction shown by the arrow F, will be referred to as "side surface A". The side surfaces of the other three sections will be referred to as "side surface B" "side surface C", and "side surface D" in a clockwise direction.

As shown in FIG. 4, FIG. 5A, and FIG. 6A, a plurality of adjustment grooves 104 and an adjustment groove 105 are arranged in a vertical direction on the side surface A of the headrest stay 102. Each adjustment groove 104 has an inclined surface 104A. The inclined surface 104A is inclined downward toward the outside of the headrest stay 102 in a radial direction. However, the adjustment groove 105 at the lowest position (hereinafter, this adjustment groove 105 will be sometimes referred to as "lowest adjustment groove 105") does not have such an inclined surface.

As shown in FIG. 5B, a cutoff portion 106 is formed by cutting off the upper portion of the side surface B of the headrest stay 102. A step is formed at the bottom end of the cutoff portion 106. The step is used to prevent the headrest stay 102 from being pulled out. Thus, the step will be referred to as "pullout prevention step 106A".

As evident from the comparison between FIG. 5A and FIG. 5B, the bottom end of the cutoff portion 106, that is, the pullout prevention step 106A is at the same level as the bottom surface 105A of the lowest adjustment groove 105, or a slightly lower level than the bottom surface 105A.

Further, as shown in FIG. 5A and FIG. 6B, a cutoff portion 108 is formed by cutting off the lower portion of the side surface C of the headrest stay 102. The top end of the cutoff portion 108 is at the same level as the top surface 105B of the lowest adjustment groove 105, or a slightly higher level than the top surface 105B.

As shown in FIG. 3, the lock portion 152 of the headrest support 150 is disposed above the seat back 12. The lock portion 152 is connected to the support portion 114 of the headrest support 150 using a screw structure. The headrest stay 102 is inserted into the mounting hole 115 of the support portion 114.

As shown in FIG. 1 and FIG. 2, the lock portion 152 is turned by approximately 90 degrees in the clockwise direction (from the position shown in FIG. 1 to the position shown in FIG. 2). After the lock portion 152 is turned by approximately 90 degrees in the clockwise direction (as shown in FIG. 2), the lock portion 152 may be returned to the original position (i.e., the position shown in FIG. 1) by turning the lock portion 152 by approximately 90 degrees in the counterclockwise direction.

Figure 7A:
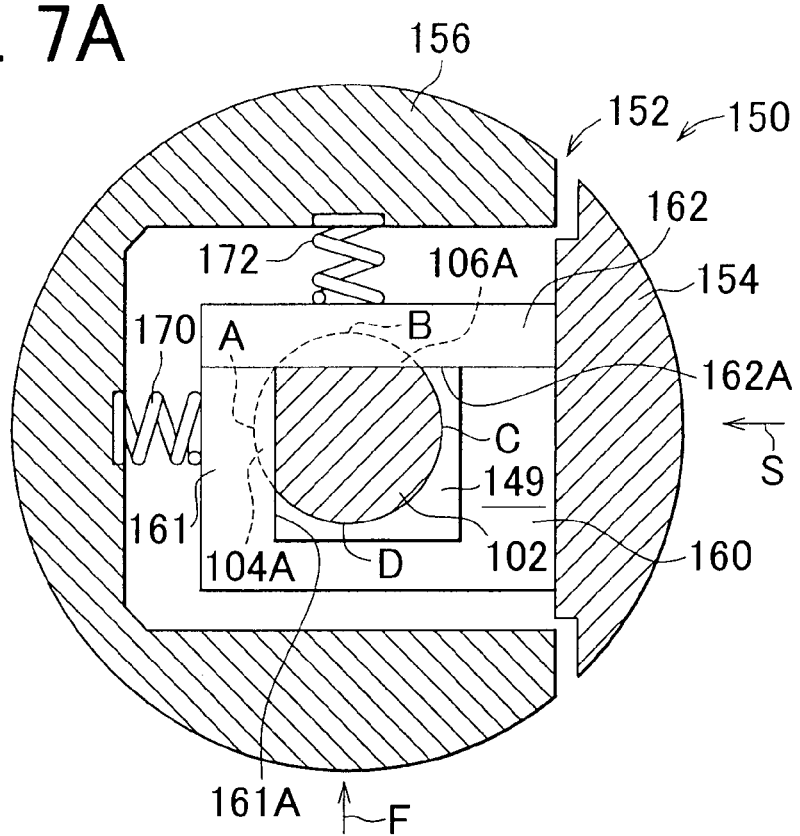
FIG. 7A is a plan view showing the headrest mechanism according to the first embodiment of the invention.
Figure 7B:
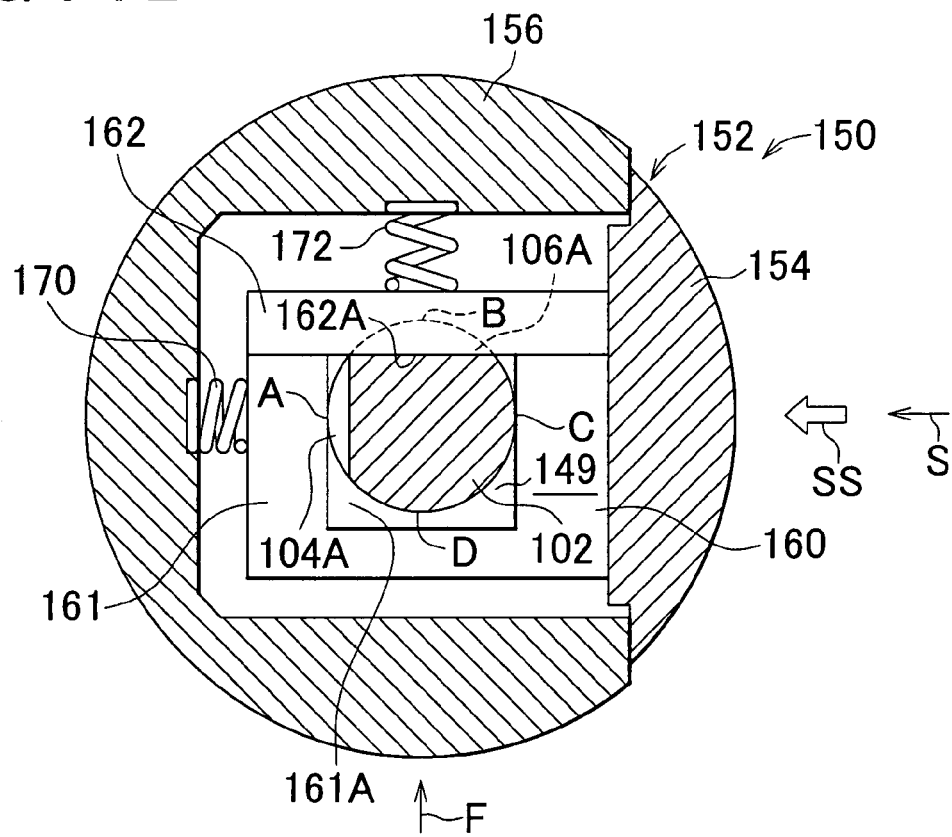
FIG. 7B shows the headrest mechanism in which a button portion is pushed.

FIGS. 7A and 7B are cross sectional views of the headrest mechanism taken along line 6A-6A in FIGS. 5A and 5B. That is, FIGS. 7A and 7B, and FIG. 6A are cross sectional views taken at the same position in FIGS. 5A and 5B. FIG. 7B shows the headrest mechanism in which a button portion 154 is pushed.

As shown in FIGS. 7A and 7B, the lock portion 152 of the headrest support 150 includes a frame portion 156 and the button portion 154. The frame portion 156 has an opening formed on the side of the side surface C of the headrest stay 102. The button portion 154 is provided on the side of the opening of the frame portion 156.

A first engagement member 160 is provided inside the lock portion 152 (i.e., inside the frame portion 156 and the button portion 154). The first engagement member 160 has an opening formed on the side of the side surface B of the headrest stay 102. The plan view of the first engagement member 160 has a substantially concave shape. The first engagement member 160 is fitted to the button portion 154. A second engagement member 162 is also provided inside the lock portion 152 (i.e., inside the frame portion 156 and the button portion 154). The plan view of the second engagement member 162 has a substantially rectangular shape. The headrest stay 102 extends through a substantially rectangular hole 149 defined by the first engagement member 160 and the second engagement member 162.

A spring 170, which functions as a pressing member, is provided between the first engagement portion 161 and the frame portion 156 on the side opposite the button portion 154. Accordingly, the entire first engagement member 160 is pressed against the button portion 154. That is, the inner surface 161A of the first engagement portion 161 of the first engagement member 160 is pressed against one of the adjustment grooves 104 (or the adjustment groove 105) on the side surface A of the headrest stay 102.

A spring 172 is provided between the second engagement member 162 and the frame portion 156. Accordingly, the entire second engagement member 162 is pressed against the first engagement member 160. That is, the inner surface 162A of the second engagement member 162 is pressed against the cutoff portion 106 on the side surface B of the headrest stay 102.

Next, the effects obtained in this embodiment will be described.

First, the adjustment operation for adjusting the height of the headrest 100 will be described.

As shown in FIG. 7A, the inner surface 161A of the first engagement portion 161 of the first engagement member 160 is pressed against one of the adjustment grooves 104 (or the adjustment groove 105) on the side surface A of the headrest stay 102. Therefore, the first engagement portion 161 of the first engagement member 160 engages with the top surface of one of the adjustment grooves 104 (or the adjustment groove 105). This prevents the headrest stay 102 from moving downward. Thus, the height of the headrest 100 is maintained at a desired height (i.e., the headrest 100 is held at the desired position of the adjustment groove 104).

When the headrest 100 is raised, the first engagement member 160 moves along the inclined surface 104A of the adjustment groove 104, against the force of the spring 170. Then, the first engagement member 160 engages with the lower adjustment groove 104 (refer also to FIG. 5A).

Because the lowest adjustment groove 105 does not have the inclined surface, the first engagement portion 161 of the first engagement member 160 engages with the bottom surface 105A of the adjustment groove 105. Accordingly, the headrest 100 cannot be pulled up any further (refer also to FIG. 5A).

When the headrest 100 is lowered, the button portion 154 is pushed in the direction shown by the arrow SS (i.e., the same direction as the direction shown by the arrow S), as shown in FIG. 7B (refer also to FIG. 1). Thus, the first engagement portion 161 of the first engagement member 160 disengages from the adjustment groove 104 of the headrest stay 102. Then, the headrest 100 is pushed downward. When the height of the headrest 100 is equal to a desired height, the button portion 154 is released. Thus, the first engagement portion 161 of the first engagement member 160 engages with the adjustment groove 104 due to the force of the spring 170. As a result, the height of the headrest 100 is maintained at the desired height.

When the button portion 154 is pushed, the first engagement portion 161 disengages from the adjustment groove 105. However, when the button portion 154 is pushed and the headrest 100 is pulled up, the second engagement member 162 engages with the pullout prevention step 106A (refer also to FIG. 5B). Accordingly, the headrest 100 cannot be pulled up any further. In other words, when the headrest stay 102 cannot be pulled out of the headrest support 150, that is, the headrest 100 cannot be removed only by pushing the button portion 154.

Next, the pullout operation for pulling out the headrest stay 102 to remove the headrest 100 will be described.

Figure 8A:
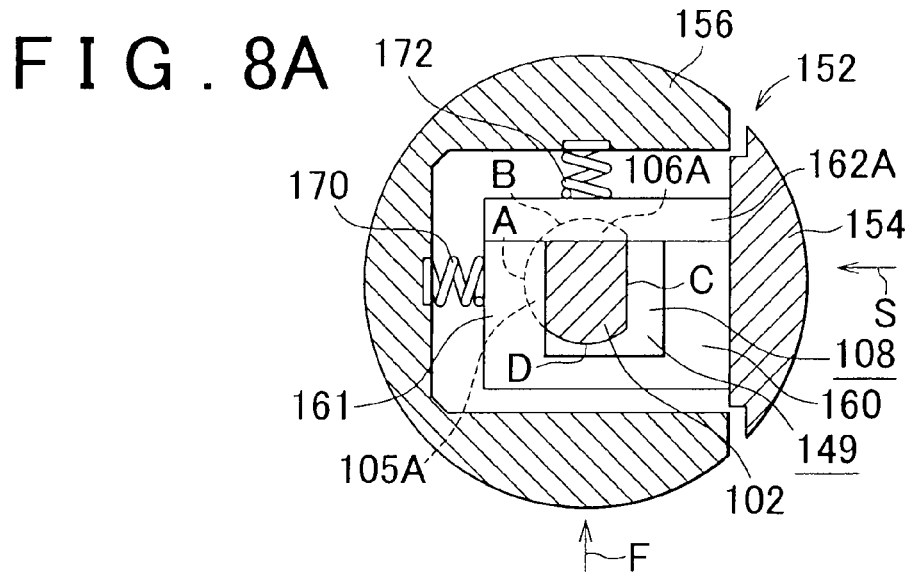
FIGS. 8A to 8C are diagrams showing the headrest mechanism in which the lock portion of a headrest support is turned, in the order of FIGS. 8A to 8C.

First, as shown in FIG. 8A, the headrest 100 is pulled up so that the first engagement portion 161 of the first engagement member 160 engages with the lowest adjustment groove 105 of the headrest stay 102.

Figure 8B:
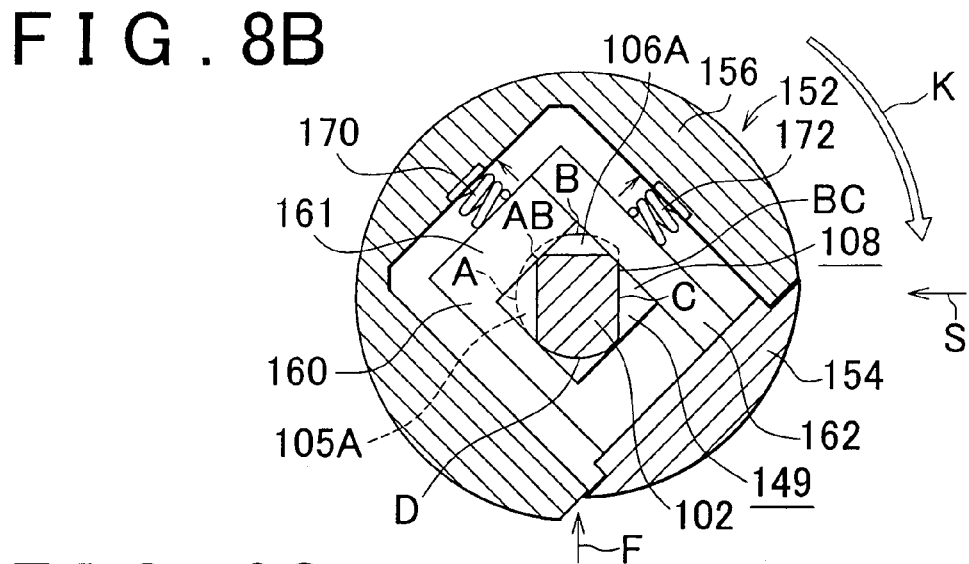
Figure 8C:
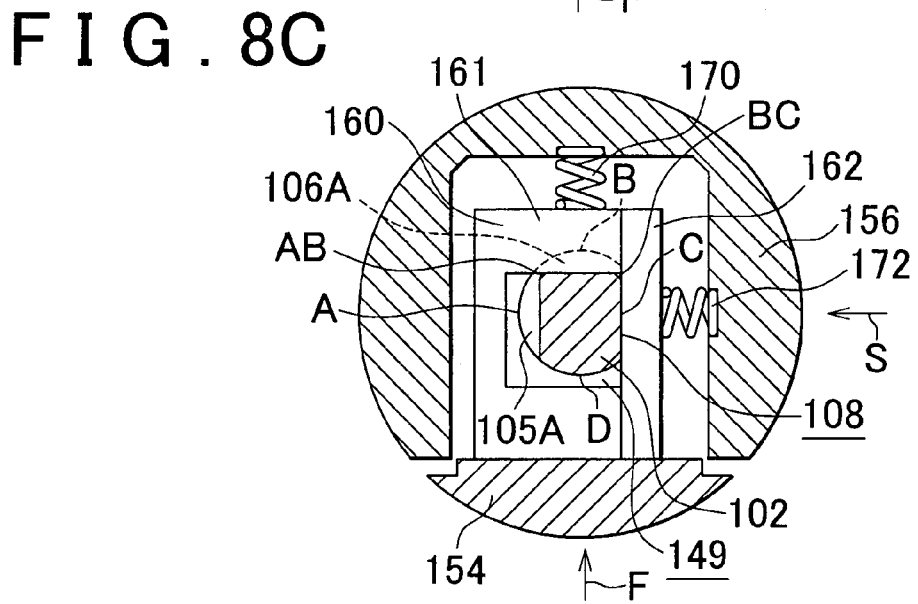

Next, as shown in FIG. 8A to FIG. 8C in the stated order, and FIGS. 1 and 2, the entire lock portion 152 of the headrest support 150 is turned by approximately 90 degrees in the clockwise direction shown by the arrow K (i.e., a first operation is performed).

When the lock portion 152 is turned, the first engagement portion 161 of the first engagement member 160 moves along a corner AB between the side surfaces A and B of the headrest stay 102, and the second engagement member 162 moves along a corner BC between the side surfaces B and C, as shown in FIG. 8B. When the first engagement portion 161 moves along the corner AB, the spring 170 is compressed. When the second engagement member 162 moves along the corner BC, the spring 172 is compressed. Because the corners AB and BC are rounded, the first engagement portion 161 and the second engagement member 162 smoothly move along the corners AB and BC, respectively (that is, the lock portion 152 of the headrest support 150 turns smoothly).

When the lock portion 152 is turned by approximately 90 degrees, the second engagement member 162 moves from the cutoff portion 106 on the side surface B to the cutoff portion 108 on the side surface C, as shown in FIG. 8C. In addition, the first engagement portion 161 of the first engagement member 160 moves from the lowest adjustment groove 105 on the side surface A to the cutoff portion 106 on the side surface B.

If the headrest 100 is pulled up after the lock portion 152 is turned in the above-described manner, the first engagement portion 161 of the first engagement member 160 engages with the pullout prevention step 106A of the headrest stay 102. Therefore, the headrest stay 102 cannot be pulled out of the headrest support 150, that is, the headrest 100 cannot be removed.

Figure 9A:
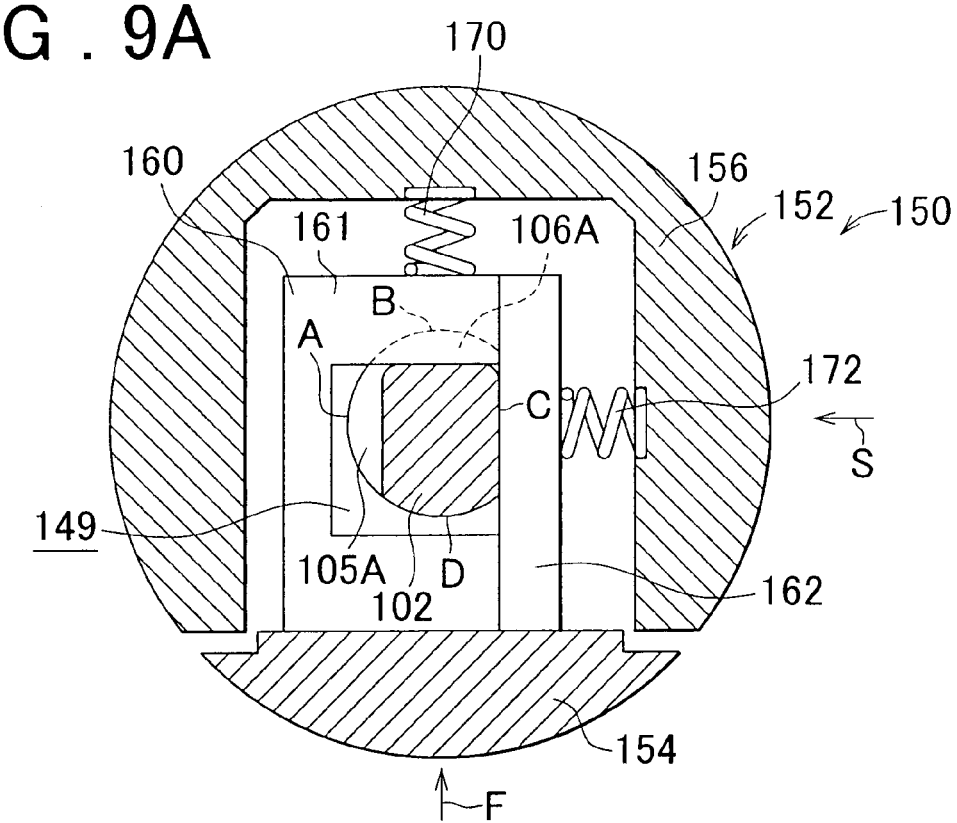
FIG. 9A is similar to FIG. 8C.
Figure 9B:
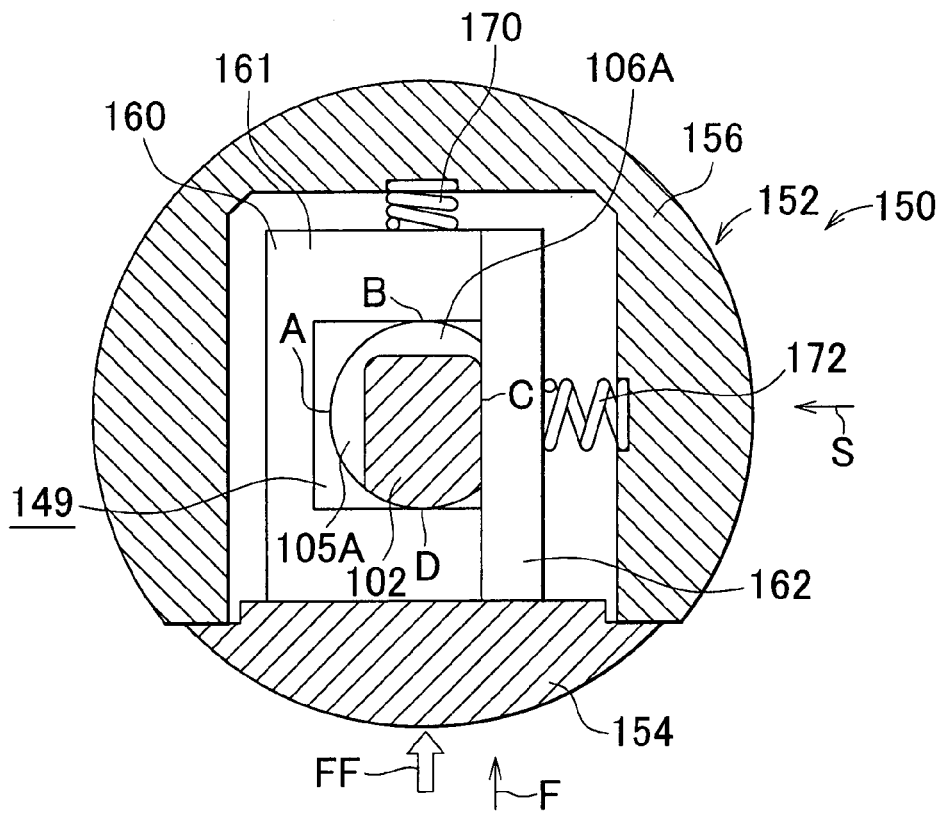
FIG. 9B shows the headrest mechanism in which a button portion is pushed.

However, as shown in FIGS. 9A and 9B, when the button portion 154 is pushed in the direction shown by the arrow FF (i.e., the same direction as the direction shown by the arrow F) after the lock portion 152 is turned in the above-described manner (i.e., a second operation is performed after the first operation is performed), the first engagement portion 161 moves, and disengages from the pullout prevention step 106A.

Thus, after the lock portion 152 is turned in the above-described manner, the button portion 154 is pushed so that the first engagement portion 161 disengages from the pullout prevention step 106A. Then, the headrest 100 is pulled up. In this manner, the headrest stay 102 may be pulled out of the headrest support 150.

To remount the headrest 100 the above-described steps may be performed in the reverse order.

As described above, in the headrest mechanism according to this embodiment, the headrest stay 102 cannot be pulled out of the headrest support 150, that is, the headrest 100 cannot be removed when the adjustment operation for adjusting the height of the headrest 100 is performed, that is, when the button portion 154 is pushed in the direction shown by the arrow SS, as shown in FIG. 1 and FIGS. 7A and 7B.

However, when the button portion 154 is pushed in the direction shown by the arrow FF (i.e., the second operation is performed) after the lock portion 152 of the headrest support 150 is turned by 90 degrees in the direction shown by the arrow K (i.e., after the first operation is performed) as shown in FIG. 2, FIGS. 8A to 8C, and FIGS. 9A and 9B, the headrest stay 102 can be pulled out of the headrest support 150, that is, the headrest 100 can be removed.

Unless the first engagement portion 161 of the first engagement member 160 engages with the lowest adjustment groove 105, the first engagement portion 161 engages with the side surface (bottom surface) of the adjustment groove 104, and the second engagement member 162 engages with the side surface (bottom surface) of the cutoff portion 106. Accordingly, the lock portion 152 of the headrest support 150 cannot be turned. In other words, the headrest stay 102 cannot be pulled out of the headrest support 150, that is, the headrest 100 cannot be removed.

Further, it is not necessary to perform troublesome operation using any additional tools or special equipment when the headrest 100 is mounted or removed.

Thus, in the headrest mechanism according to the embodiment, only when the pullout operation is performed, the headrest stay 102 can be pulled out of the headrest support 150. The pullout operation differs from the adjustment operation for adjusting the height of the headrest 100. This prevents the headrest stay 102 from being easily pulled out. In addition, the headrest stay 102 can be pulled out of the headrest support 150 by the direct operations without using any additional tools or special equipment.

Further, the pullout operation includes the first component of turning the lock portion 152, and the second component of pushing the button portion 154. That is, the headrest stay 102 can be pulled out only when the two components of the pullout operation are performed. Further, unless the height of the headrest 100 is adjusted to a predetermined height, the first operation of turning the lock portion 152 cannot be performed. This prevents the headrest 100 from being easily pulled out.

Next, a second embodiment of the invention will be described. The same and corresponding members as in the first embodiment are denoted by the same names, and the redundant description thereof will be omitted. In the description of the third to sixth embodiments as well, the same and corresponding members as in the first embodiment are denoted by the same names, and the redundant description thereof will be omitted.

Figure 11:
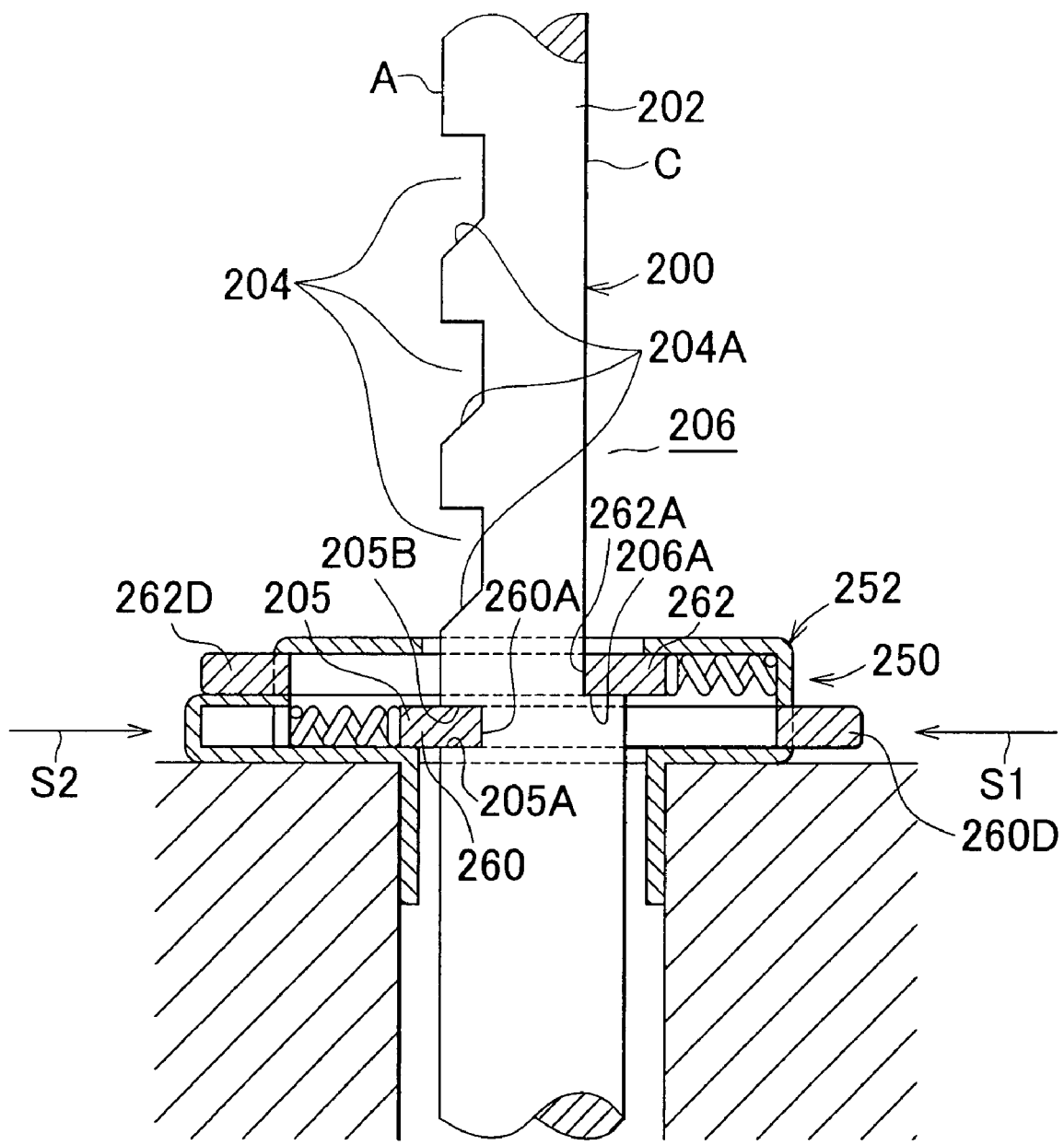
FIG. 11 is a longitudinal sectional view showing the headrest mechanism according to the second embodiment of the invention.

As shown in FIG. 11, a plurality of adjustment grooves 204 and an adjustment groove 205 are arranged in the vertical direction on the surface A of a headrest stay 202 provided in a headrest 200. Each adjustment groove 204 has an inclined surface 204A. The inclined surface 204A is inclined downward toward the outside of the headrest stay 202 in the radial direction. However, the adjustment groove 205 at the lowest position (hereinafter, this adjustment groove 205 will be sometimes referred to as "lowest adjustment groove 205") does not have such an inclined surface.

A cutoff portion 206 is formed by cutting off the upper portion of the side surface C of the headrest stay 202. A step is formed at the bottom end of the cutoff portion 206. The step is used to prevent the headrest stay 202 from being pulled out. Thus, the step will be referred to as "pullout prevention step 206A".

The bottom end of the cutoff portion 206, that is, the pullout prevention step 206A is at a higher level than the top surface 205B of the lowest adjustment groove 205.

Figure 10:
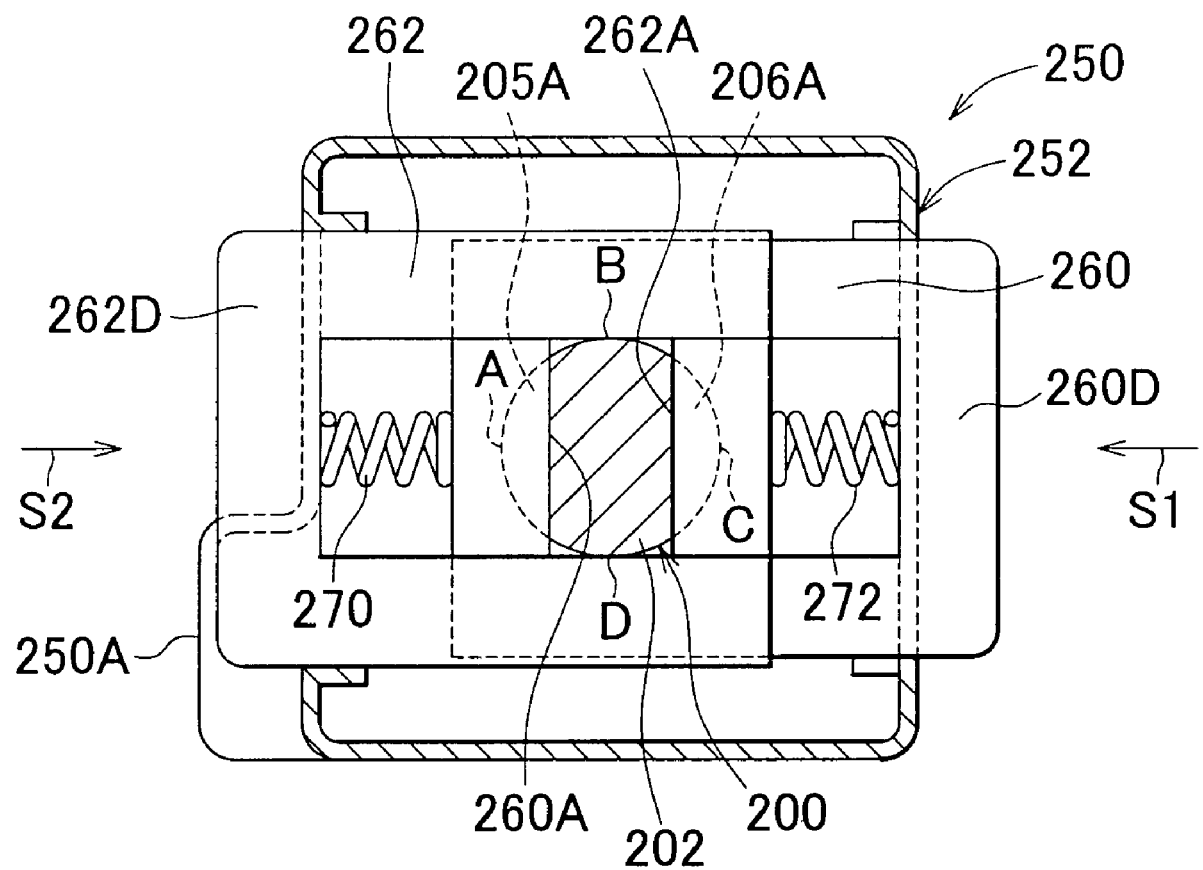
FIG. 10 is a plan view showing a headrest mechanism according to a second embodiment of the invention.

As shown also in FIG. 10, a first engagement member 260 and a second engagement member 262 are arranged in the vertical direction in the lock portion 252 of a headrest support 250. Each of the first and second engagement members 260 and 262 has a rectangular frame shape. The second engagement member 262 is disposed above the first engagement member 260. The headrest stay 202 extends through the holes of both of the first and second engagement members 260 and 262.

A spring 270 presses the first engagement member 260 in the direction from the side surface A to the side surface C of the headrest stay 202. That is, the inner surface 260A of the hole of the first engagement member 260 is pressed against one of the adjustment grooves 204 or the adjustment groove 205 on the side surface A of the headrest stay 202. The first engagement member 260 includes a button portion 260D formed on the side opposite the spring 270. The button portion 260D outwardly protrudes from the lock portion 252 of the headrest support 250.

A spring 272 presses the second engagement member 262 in the direction from the side surface C to the side surface A of the headrest stay 202. That is, the inner surface 262A of the hole of the second engagement member 262 is pressed against the cutoff portion 206 on the side surface C of the headrest stay 202. The second engagement member 262 includes a button portion 262D formed on the side opposite the spring 272. The button portion 262D outwardly protrudes from the lock portion 252 of the headrest support 250.

Further, a protrusion portion 250A is formed near the button portion 262D in the lock portion 252 of the headrest support 250. The protrusion portion 250A overlaps a part of the button portion 262D (for example, a part of the button portion 262D that faces toward the front portion of the vehicle body).

Next, the effects obtained in this embodiment will be described.

First, the adjustment operation for adjusting the height of the headrest 200 will be described.

The adjustment operation for adjusting the height of the headrest 200 is substantially similar to that in the first embodiment. Therefore, only different steps of the adjustment operation will be described.

Figure 12A:
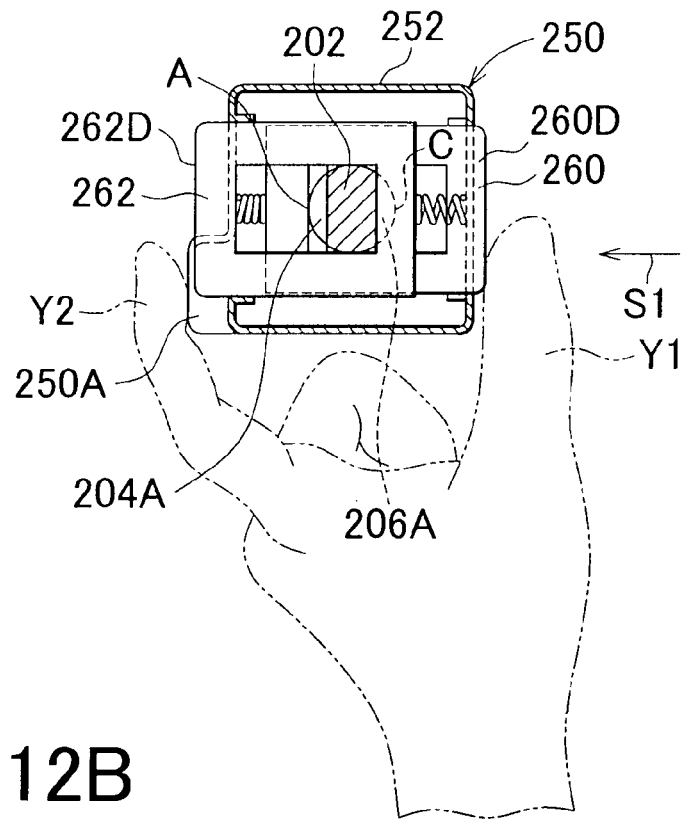
FIGS. 12A and 12B are plan views showing the headrest mechanism according to the second embodiment of the invention, FIG. 12A explains an adjustment operation for adjusting the height of the headrest, and FIG. 12B explains a pullout operation for pulling out the headrest to remove the headrest.

As shown in FIG. 12A, to adjust the height of the headrest 200, the button portion 260D of the first engagement member 260 is pushed in the direction shown by the arrow S1 by a finger Y1 (the thumb of a left hand in FIG. 12A). Thus, the first engagement member 260 disengages from the adjustment groove 204 (or the adjustment groove 205). At this time, another finger Y2 (the index finger of the left hand in FIG. 12A) touches the protrusion portion 250A on the side opposite the button portion 260D. Accordingly, the button portion 262D of the second engagement member 262 is not pushed. This prevents the button portion 262D from being easily pushed (only the button portion 260D of the first engagement member 260 can be easily pushed).

When the button portion 260D is kept pushed and the headrest 200 is pulled up, the second engagement member 262 on the side of the side surface C engages with the pullout prevention step 206A of the headrest stay 202. Therefore, the headrest 200 cannot be pulled up any further. Thus, the headrest stay 202 cannot be pulled out of the headrest support 250, that is, the headrest 200 cannot be removed.

Next, the pullout operation for pulling out the headrest stay 202 to remove the headrest 200 will be described.

Figure 12B:
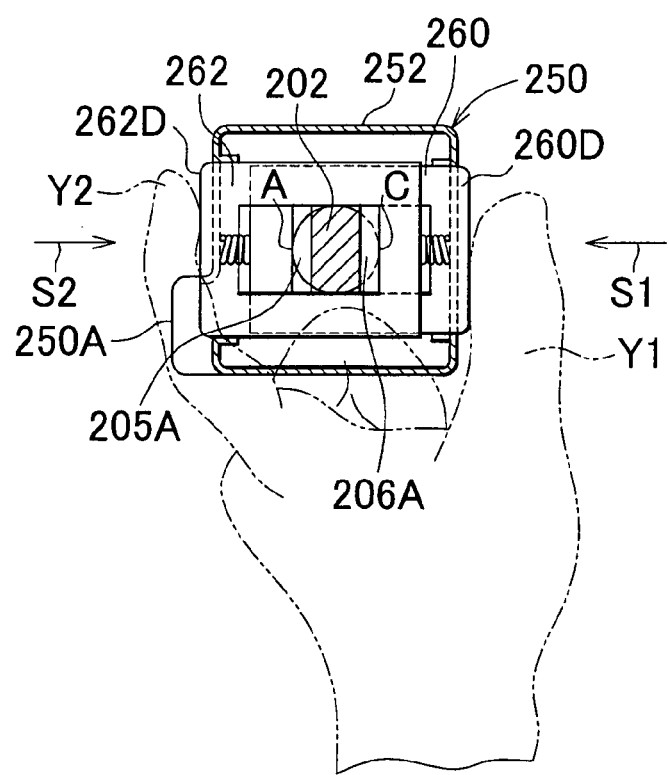

As shown in FIG. 12B, the finger Y1 (the thumb of the left hand in FIG. 12B) pushes the button portion 260D of the first engagement member 260 in the direction shown by the arrow S1, and the other finger Y2 (the index finger of the left hand in FIG. 12B) pushes the button portion 262D of the second engagement member 262 on the opposite side.

When the button portions 260D and 262D on the opposite sides are held between the two fingers Y1 and Y2, and pushed by the two fingers Y1 and Y2, the first engagement member 260 disengages from the adjustment groove 204 (or the adjustment groove 205), and the second engagement member 262 disengages from the pullout prevention step 206A.

By pulling up the headrest 200 in this situation, the headrest stay 202 can be pulled out of the headrest support 250; that is, the headrest 200 can be removed.

To remount headrest stay 202 on the seat back 12 again, both of the button portions 260D and 262D are kept pushed, and the headrest stay 202 is inserted into the headrest support 250.

As described above, in the headrest mechanism according to this embodiment, the headrest stay 202 cannot be pulled out of the headrest support 250, that is, the headrest 200 cannot be removed when the adjustment operation for adjusting the height of the headrest 200 is performed, that is, when the button portion 260D is pushed in the direction shown by the arrow S1.

However, when the button portion 260D is pushed in the direction shown by the arrow S1, and the button portion 262D is pushed in the direction shown by the arrow S2 (i.e., the pullout operation is performed) as shown in FIG. 12B, the headrest stay 202 can be pulled out of the headrest support 250, that is, the headrest 200 can be removed.

Thus, in the headrest mechanism according to the embodiment, the headrest stay 202 can be pulled out of the headrest support 250 only when the pullout operation is performed. The pullout operation differs from operation for adjusting the height of the headrest 200. This prevents the headrest stay 202 from being easily pulled out. In addition, the headrest stay 202 can be pulled out of the headrest support 250 by the direct operations without using any tool or special operating tool.

Next, a third embodiment of the invention will be described.

Figure 14:
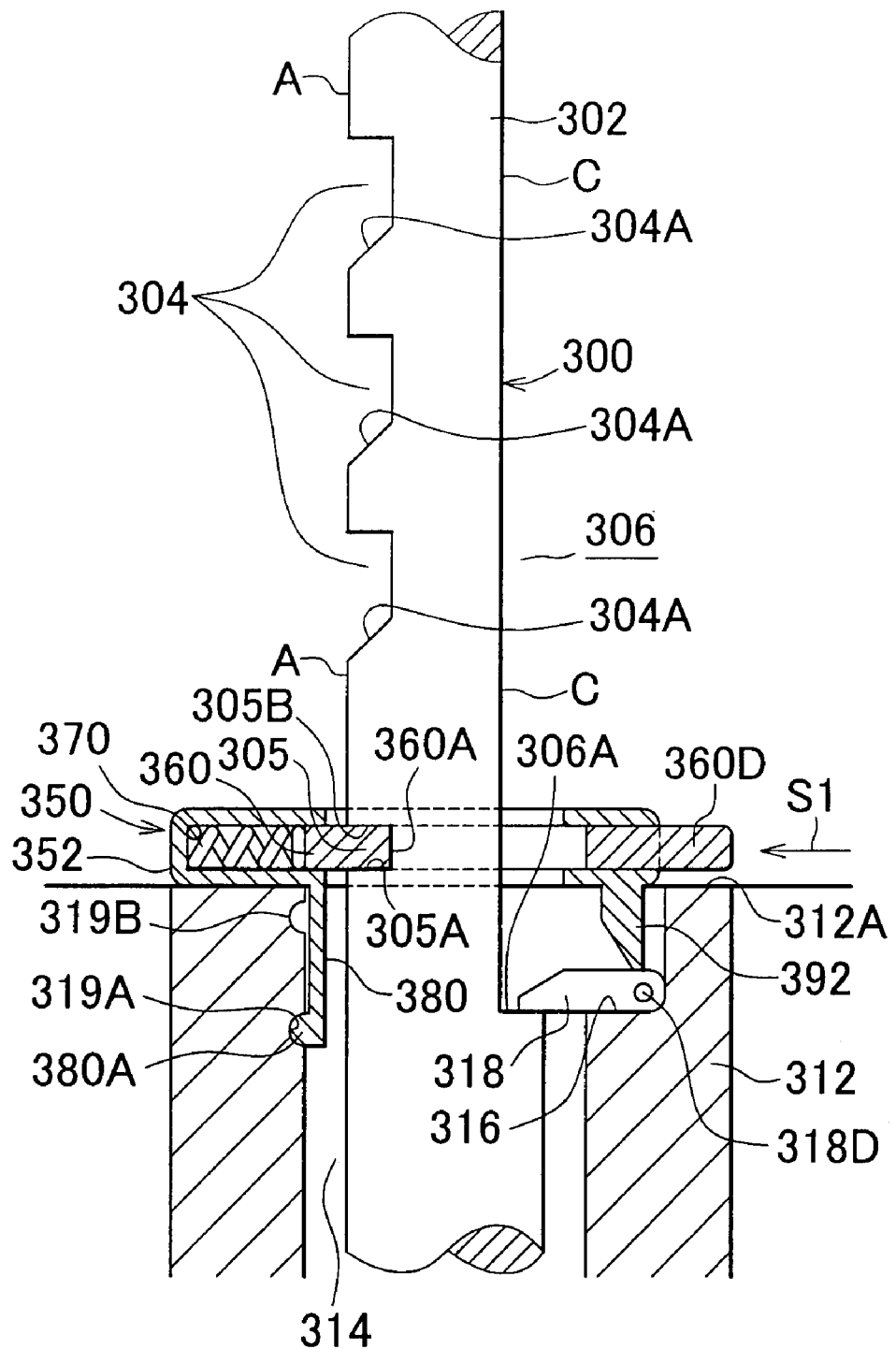
FIG. 14 is a longitudinal cross sectional view showing the headrest mechanism according to the third embodiment of the invention.

As shown in FIG. 14, a plurality of adjustment grooves 304 and an adjustment groove 305 are arranged in the vertical direction on the side surface A of the headrest stay 302 provided in the headrest 300. Each adjustment groove 304 has an inclined surface 304A. The inclined surface 304A is inclined downward toward the outside of the headrest stay 302 in the radial direction. However, the adjustment groove 305 at the lowest position (hereinafter, this adjustment groove 305 will be sometimes referred to as "lowest adjustment groove 305") does not have such an inclined surface.

A cutoff portion 306 is formed by cutting off the upper portion of the side surface C of the headrest stay 302. A step is formed at the bottom end of the cutoff portion 306. The step is used to prevent the headrest stay 302 from being pulled out. Thus, the step will be referred to as "pullout prevention step 306A".

The bottom end of the cutoff portion 306, that is, the pullout prevention step 306A is at a lower level than the bottom surface 305A of the lowest adjustment groove 305.

In the support portion 312, a step 316 is formed on the side of the side surface C. The step 316 is at a lower level than the top surface 312A of the support portion 312.

A pivot member 318, which may pivot around a pivot center 318D, is provided on the step 316. The end of the pivot member 318 (i.e., the end on the side opposite the pivot center 318D) may engage with the pullout prevention step 306A.

Figure 13:
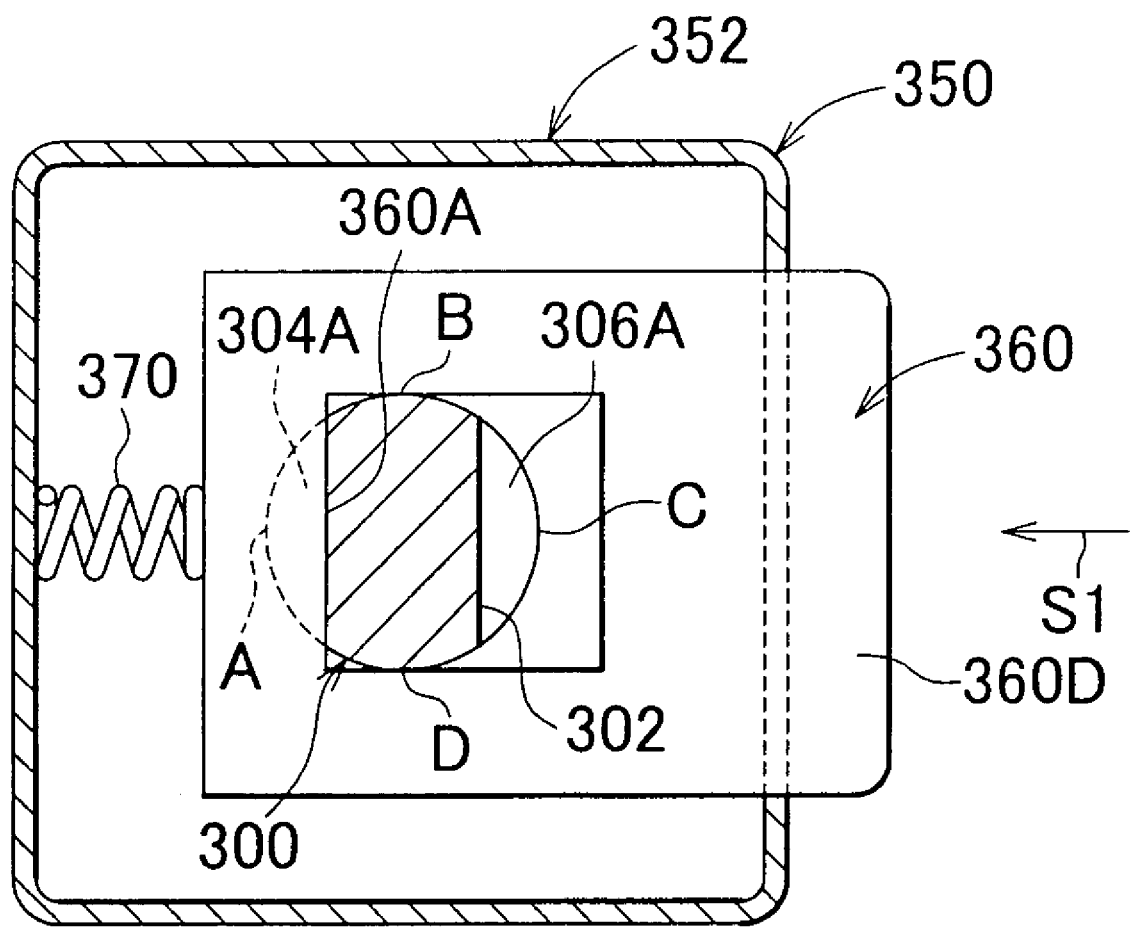
FIG. 13 is a plan view showing a headrest mechanism according to a third embodiment of the invention.

As shown in FIG. 13, an engagement member 360 is provided in the lock portion 312 of the headrest support 350. The engagement member 360 has a rectangular frame shape. The headrest stay 302 extends through the hole of the engagement member 360.

A spring 370 presses the engagement member 360 in the direction from the side surface A to the side surface C of the headrest stay 302. That is, the inner surface 360A of the hole of the engagement member 360 is pressed against one of the adjustment grooves 304 (or the adjustment groove 305) on the side surface A of the headrest stay 302. The inner surface 360A is on the side of the side surface A. The engagement member 360 includes a button portion 360D formed on the side opposite the spring 370. The button portion 360D outwardly protrudes from the lock portion 352.

As shown in FIG. 14, in the lock portion 352 of the headrest support 350, a downward-extending portion 380 is provided on the side of the spring 370. The downward-extending portion 380 is inserted into the mounting hole 314 of the support portion 312. A protrusion 380A, which has a semicircular cross section, is formed at the end of the downward-extending portion 380.

In the lock portion 352, a pivot stopper 392 is provided on the side of the button portion 360D. The pivot stopper 392 extends downward. The end portion of the pivot stopper 392 pushes the pivot member 318, thereby stopping the pivot movement of the pivot member 318.

A first engagement hole 319A is formed on the side surface of the mounting hole 314 of the support portion 312. The protrusion 380A of the downward-extending portion 380 engages with the first engagement hole 319A. Further, a second engagement hole 319B is formed above the first engagement hole 319A. The protrusion 380A may engage with the second engagement hole 319B.

Next, the effects obtained in this embodiment will be described.

The height of the headrest 300 may be adjusted when the button portion 360D of the engagement member 360 is pushed. The adjustment operation in the third embodiment is substantially similar to those in the first embodiment and the second embodiment. Therefore, the detailed description thereof will be omitted.

Next, the pullout operation for pulling out the headrest stay 302 to remove the headrest 300 will be described.

When the pivot stopper 392 stops the pivot movement of the pivot member 318 as shown in FIG. 14, the end portion of the pivot member 318 engages with the pullout prevention step 306A. Thus, the headrest stay 302 cannot be pulled up any further.

Figure 15:
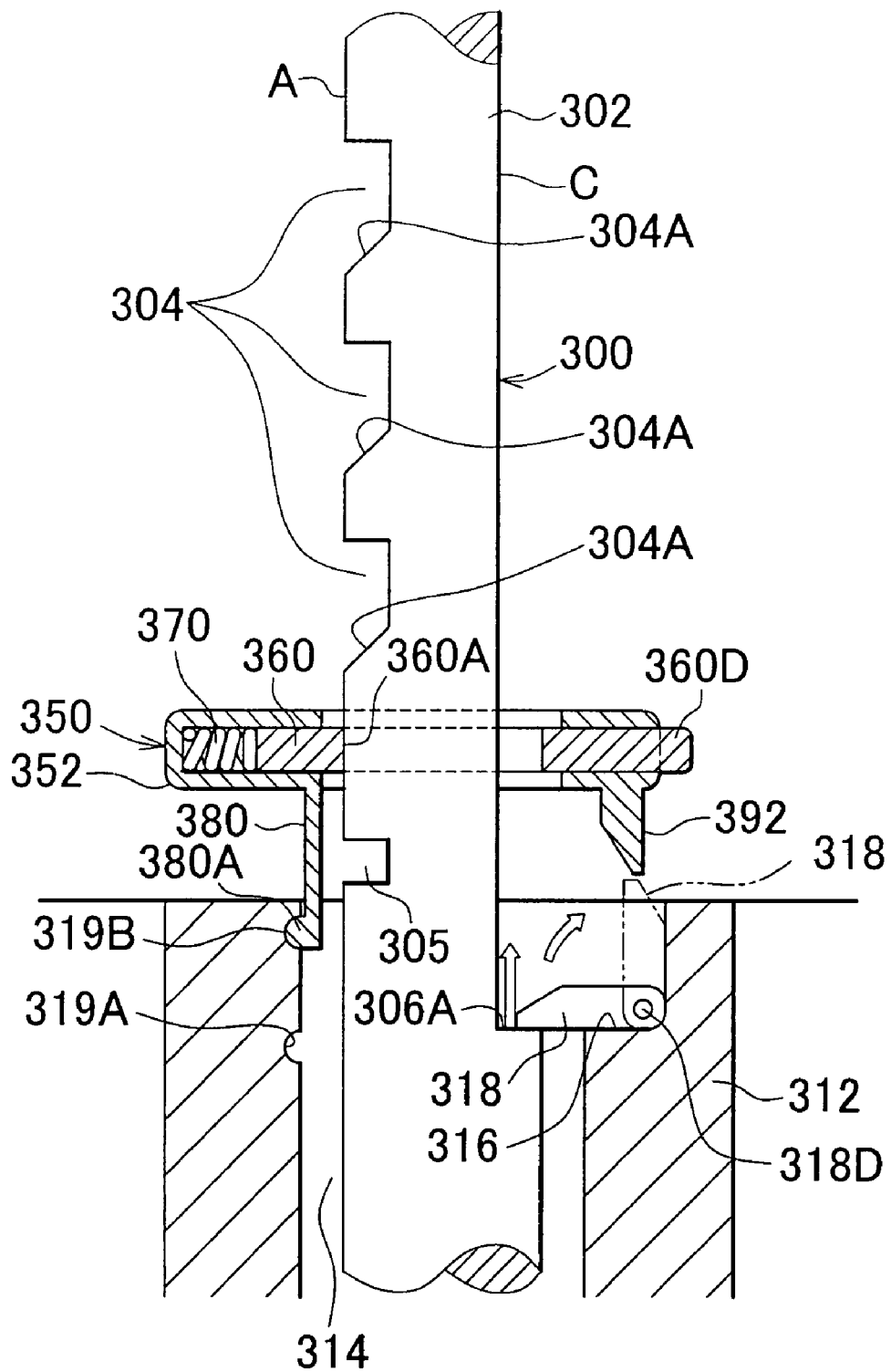
FIG. 15 is a diagram showing the headrest mechanism in which the lock portion of a headrest support is pulled up from the position shown in FIG. 14.

However, when the button portion 360D is kept pushed (i.e., the first operation is performed), and the entire lock portion 352 of the headrest support 350 is pulled up (i.e., the second operation is performed) as shown in FIG. 15, the pivot stopper 392 leaves the pivot member 318, thereby allowing the pivot member 318 to pivot.

At this time, the protrusion 380A of the downward-extending portion 380 disengages from the first engagement hole 319A, and engages with the second engagement hole 319B. Thus, the lock portion 352 does not move downward, that is, the lock portion 352 is held at this position.

When the headrest 300 is pulled up in this situation, the pullout prevention step 306A of the headrest stay 302 pushes the pivot member 318 upward, and the pivot member 318 pivots as shown by the two-dot chain lines in FIG. 15. That is, the pivot member 318 disengages from the pullout prevention step 306A. Thus, the button portion 360D is kept pushed, and the headrest stay 302 is pulled out of the headrest support 350, that is, the headrest 300 is removed.

Figure 16A:
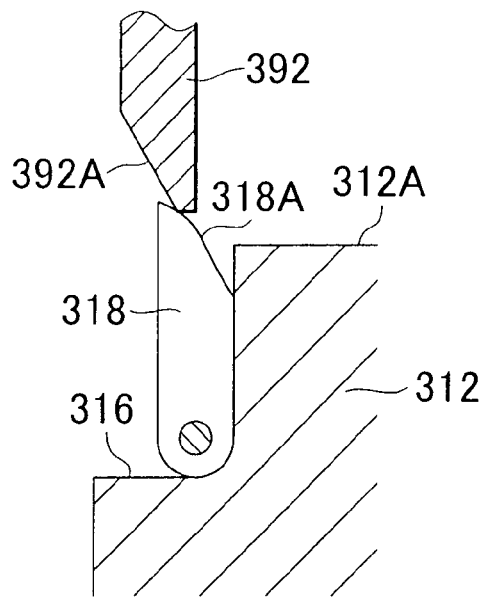
FIGS. 16A to 16C are diagrams showing the situation where the lock portion of the headrest support is pushed downward, and a pivot stopper pushes a pivot portion to an original position, in the order of FIGS. 16A to 16C.
Figure 16B:
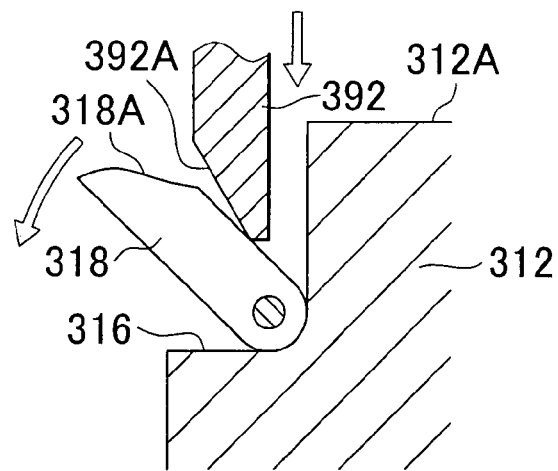
Figure 16C:
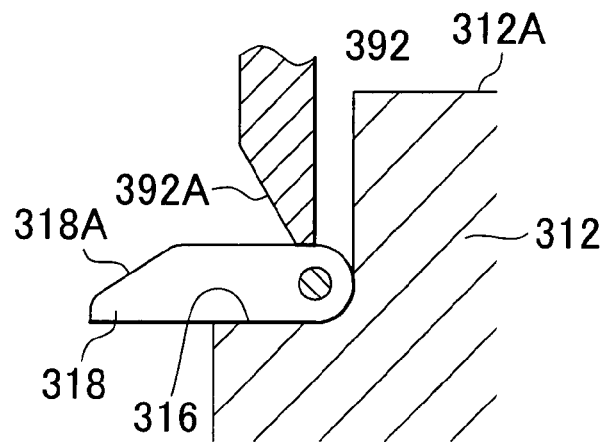

As shown in FIG. 16A, an inclined surface 318A is formed at the end of the pivot member 318, and an inclined surface 392A is formed at the end of the pivot stopper 392. Accordingly, as shown in FIGS. 16A to 16C in the stated order, when the lock portion 352 of the headrest support 350 is pushed downward, the inclined surface 318A of the pivot member 318 contacts the inclined surface 392A of the pivot stopper 392. Then, the pivot stopper 392 causes the pivot member 318 to pivot. Finally, the pivot stopper 392 stops the pivot movement of the pivot member 318.

To remount the headrest 300 the lock portion 352 of the headrest support 350 is pulled up. In addition, the button portion 360D is kept pushed, and the headrest stay 302 is inserted into the headrest support 350 (refer to FIG. 15). Then, the lock portion 352 is pushed downward (refer to FIGS. 16A to 16C). In this manner, the headrest 300 may be remounted (refer to FIG. 14).

As described above, in the headrest mechanism according to this embodiment, as shown in FIGS. 13 and 14, the headrest stay 302 cannot be pulled out of the headrest support 350, that is, the headrest 300 cannot be removed when the adjustment operation for adjusting the height of the headrest 300 is performed, that is, when the button portion 360D is pushed in the direction shown by the arrow S1.

However, by pulling up the lock portion 352 of the headrest support 350 (i.e., by performing the pullout operation) as shown in FIG. 15, the pivot member 318 is allowed to pivot. Thus, the headrest stay 302 can be pulled out of the headrest support 350, that is, the headrest 300 can be removed.

Thus, in the headrest mechanism according to this embodiment, only when the pullout operation is performed, the headrest stay 302 can be pulled out of the headrest support 350. The pullout operation differs from the adjustment operation for adjusting the height of the headrest 300. This prevents the headrest stay 302 from being easily pulled out. In addition, the headrest stay 302 can be pulled out of the headrest support 350 by the direct operations without using any additional tools or special equipment.

Next a fourth embodiment of the invention will be described.

Figure 17:
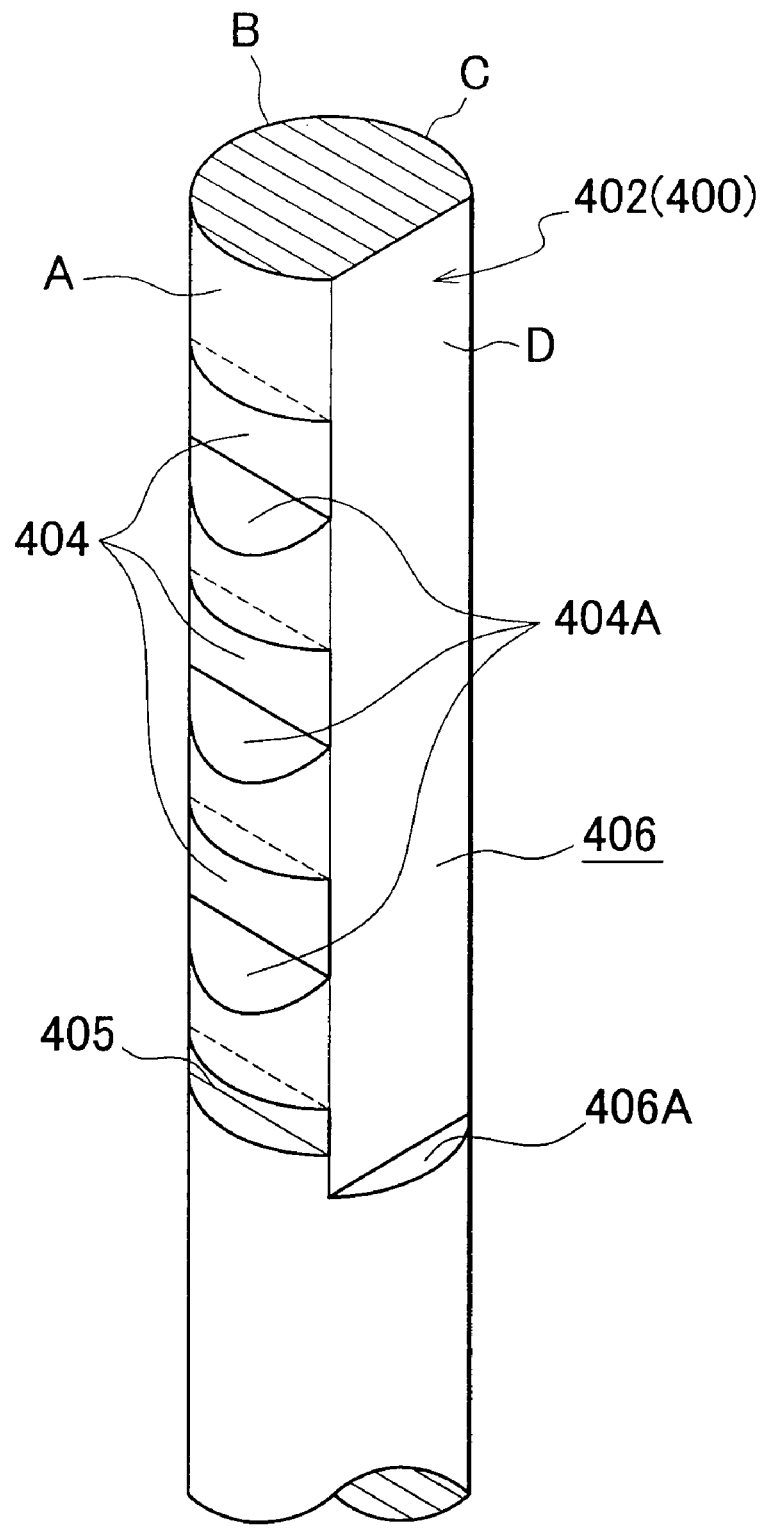
FIG. 17 is a perspective view showing the headrest stay of a headrest mechanism according to a fourth embodiment of the invention.

As shown in FIG. 17, a plurality of adjustment grooves 404 and an adjustment groove 405 are arranged in the vertical direction on the side surface A of a headrest stay 402. Each adjustment groove 404 has an inclined surface 404A. The inclined surface 404A is inclined downward toward the outside of the headrest stay 402 in the radial direction. However, the adjustment groove 405 at the lowest position (hereinafter, this adjustment groove 405 will be sometimes referred to as "lowest adjustment groove 405") does not have such an inclined surface.

A cutoff portion 406 is formed by cutting off the upper portion of the side surface C of the headrest stay 402. A step is formed at the bottom end of the cutoff portion 406. The step is used to prevent the headrest stay 404 from being pulled out. Thus, the step will be referred to as "pullout prevention step 406A".

Figure 18:
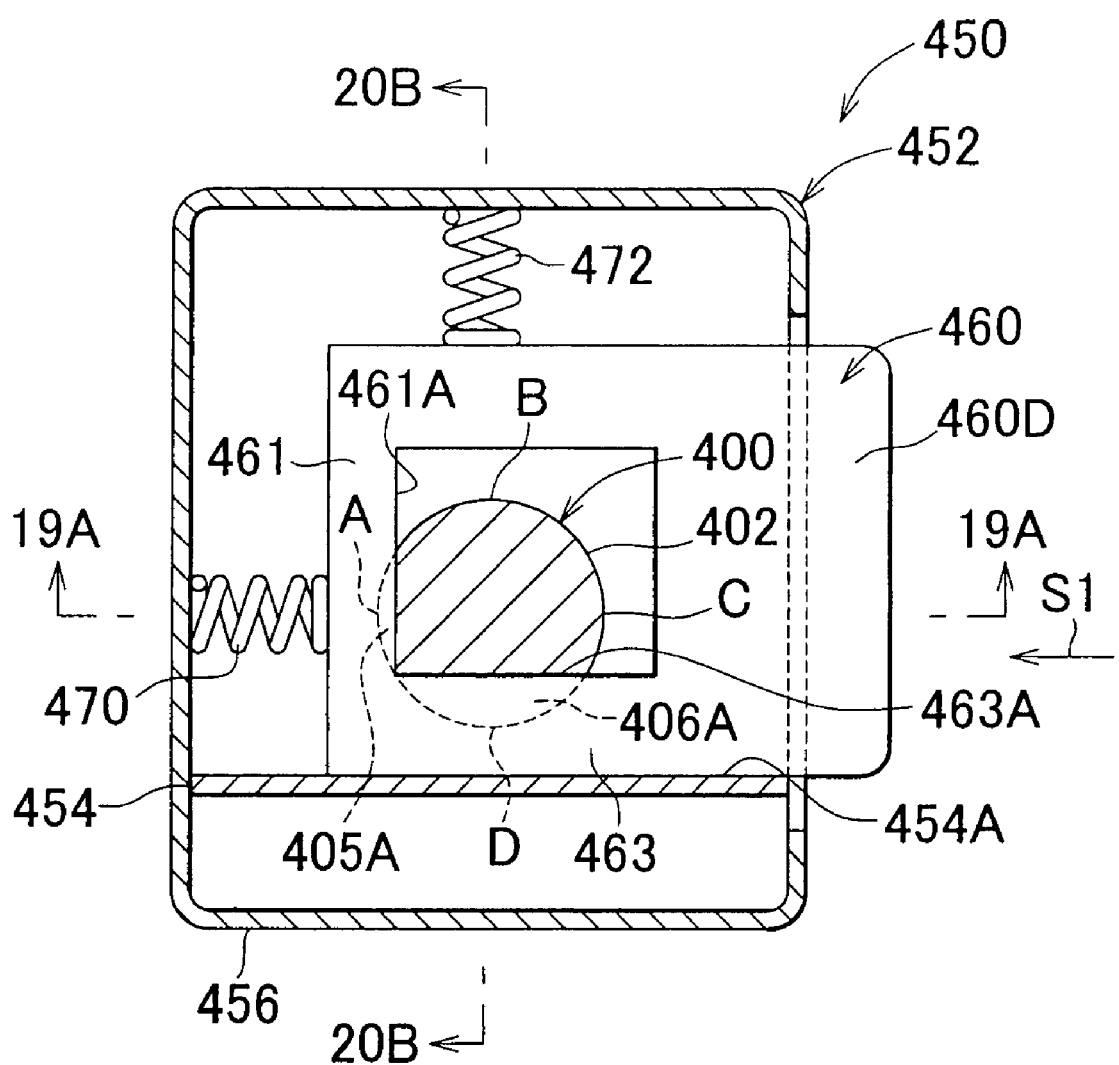
FIG. 18 is a plan view showing the headrest mechanism according to the fourth embodiment of the invention.

As shown in FIG. 18, an engagement member 460 is provided in the lock portion 452 of the headrest support 450. The engagement member 460 has a rectangular frame shape. The headrest stay 402 extends through the hole of the engagement member 460.

A spring 470 presses the engagement member 460 in the direction from the side surface A to the side surface C of the headrest stay 402. That is, the inner surface 461A of the first engagement portion 461 of the engagement member 460 is pressed against one of the adjustment grooves 404 (or the adjustment groove 405) on the side surface A of the headrest stay 402. The inner surface 461A is on the side of the spring 470. The engagement member 460 includes a button portion 460D formed on the side opposite the spring 470. The button portion 460D outwardly protrudes from the lock portion 452.

Further, a spring 472 presses the engagement member 460 in the direction from the side surface B to the side surface D of the headrest stay 402. Thus, the second engagement portion 463 of the engagement member 460 is pressed against the side surface 454A of the top chamber 454 (described later) of the lock portion 462. The second engagement portion 463 is on the side opposite the spring 472. The inner surface 463A of the second engagement portion 463 of the engagement member 460 is near the cutoff portion 406 on the side surface D of the headrest stay 402.

Figure 19:
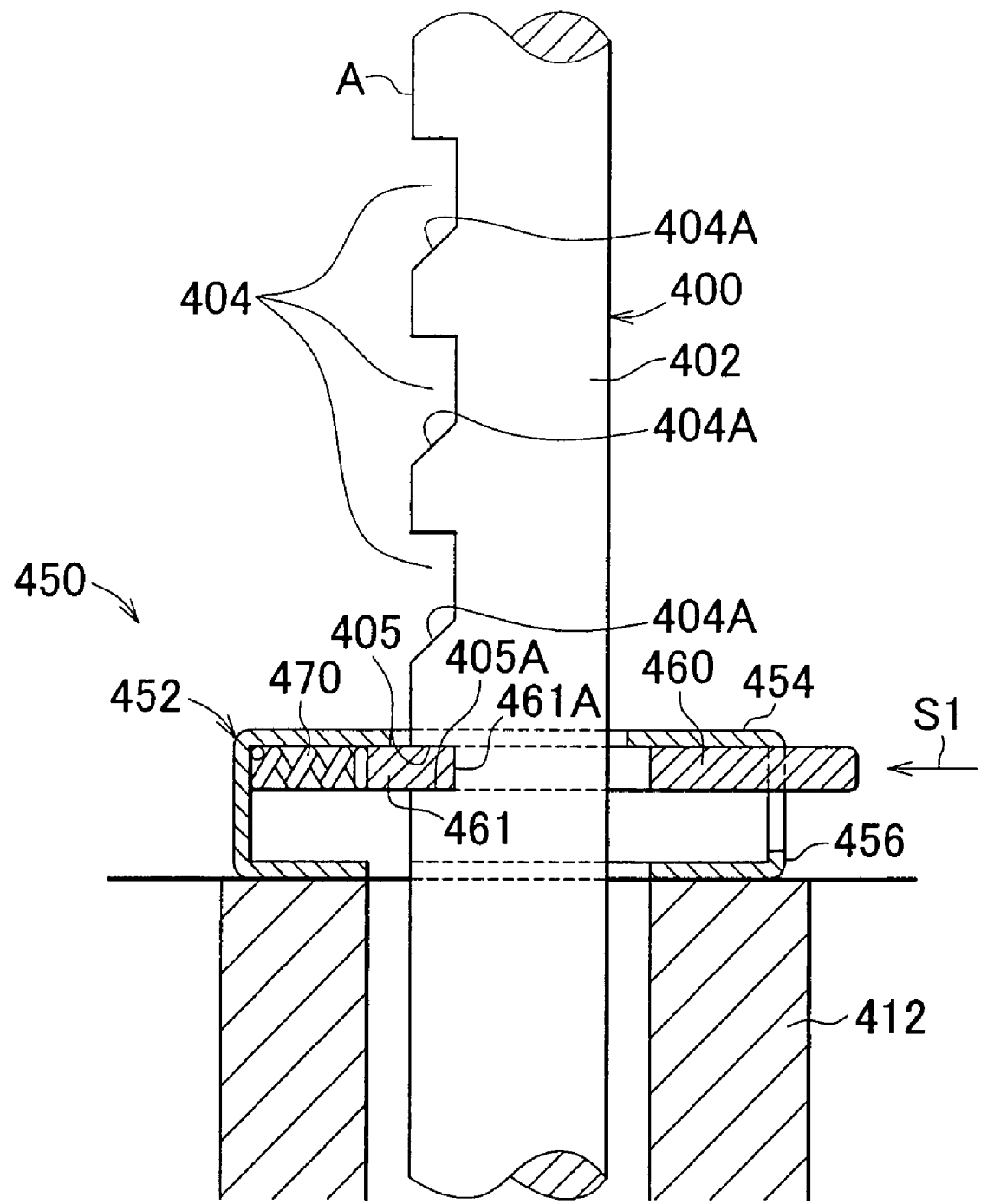
FIG. 19 is a longitudinal cross sectional view showing the headrest mechanism according to the fourth embodiment of the invention.
Figure 20A:
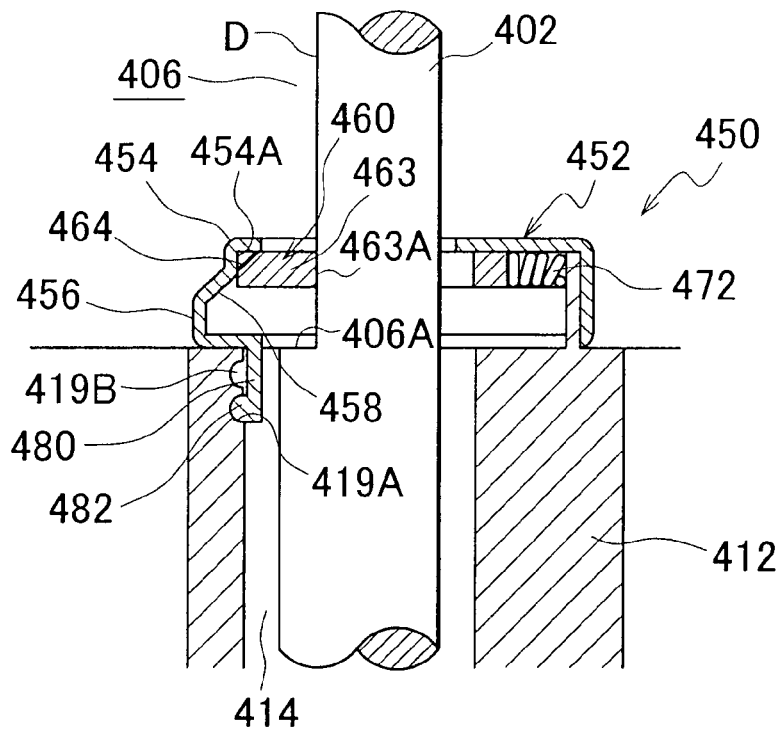
FIGS. 20A and 20B are longitudinal cross sectional views showing the headrest mechanism according to the fourth embodiment of the invention.
Figure 20B:
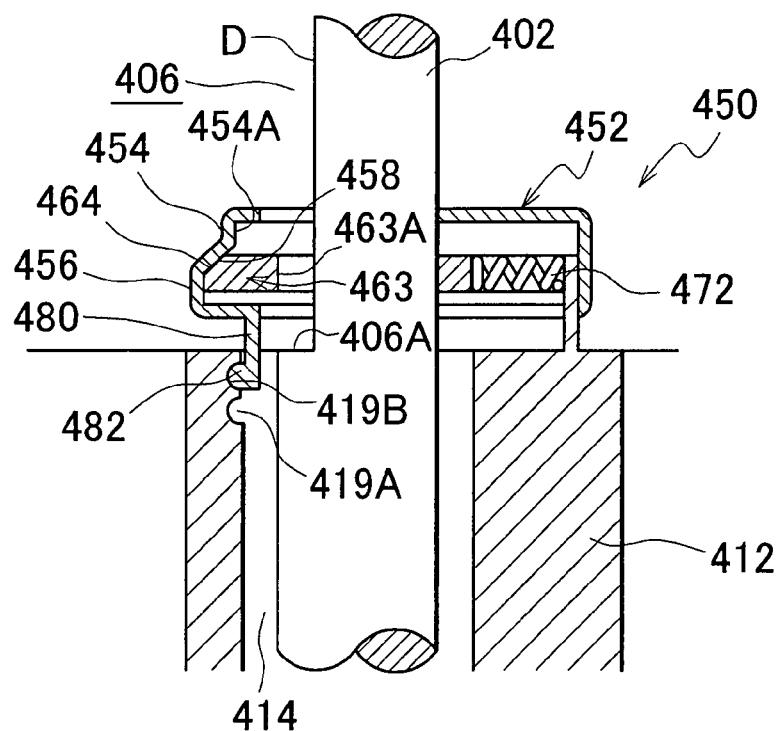

FIG. 19 is a cross sectional view taken along line 19A-19A in FIG. 18. FIGS. 20A and 20B are cross sectional views taken along line 20B-20B in FIG. 18. As shown in FIG. 19 and FIGS. 20A and 20B, the lock portion 452 of the headrest support 450 includes the top chamber 454 and the bottom chamber 456. As shown in FIGS. 20A and 20B, the portion of the bottom chamber 456, which is on the side opposite the spring 472, outwardly protrudes from the top chamber 454. An inclined surface 458 is formed in the bottom chamber 456 of the lock portion 452. The inclined surface 458 is inclined downward toward the outside. The engagement member 460 is usually housed in the top chamber 454. An inclined surface 464 is formed in the top outer portion of the second engagement portion 463 of the engagement member 460. The inclined surface 464 is inclined downward toward the outside.

As shown in FIG. 20A and 20B, in the lock portion 452 of the headrest support 450, a downward-extending portion 480 is provided on the side opposite the spring 472. The downward-extending portion 480 is inserted into the mounting hole 414 of the support portion 412. A protrusion 482, which has a semicircular cross section, is formed at the end of the downward-extending portion 480.

A first engagement hole 419A is formed on the side surface of the mounting hole 414 of the support portion 412. The protrusion 482 engages with the first engagement hole 419A. Further, a second engagement hole 419B is formed above the first engagement hole 419A. The protrusion 482 may engage with the second engagement hole 419B.

Next, the effects obtained in this embodiment will be described.

As shown in FIGS. 18 and 19, the height of the headrest 400 may be adjusted when the button portion 460D of the engagement member 460 is pushed in the direction shown by the arrow S1. The adjustment operation in this embodiment is substantially similar to those in the embodiments that have been described. Therefore, the detailed description thereof will be omitted.

Next, the pullout operation for pulling out the headrest stay 402 to remove the headrest 400 will be described.

As shown in FIG. 18 and FIG. 20A, if the headrest 400 is pulled up, the second engagement portion 463 of the engagement member 460 engages with the pullout prevention step 406A. Accordingly, the headrest 400 cannot be pulled up any further.

However, as shown in FIG. 20B and FIGS. 21A to 21C, when the entire lock portion 452 of the headrest support 450 is pulled up (i.e., the first operation is performed), the engagement member 460 moves along the inclined surface 458 to the bottom chamber 456, because the spring 472 presses the engagement member 460 toward the side opposite the spring 472. That is, the second engagement portion 463 of the engagement member 460 moves toward the side opposite the spring 472 (i.e., toward the outside). Therefore, engagement of the second engagement portion 463 with the pullout prevention step 406A is prevented.

The protrusion 482 of the downward-extending portion 480 disengages from the first engagement hole 419A, and engages with the second engagement hole 419B. Therefore, the lock portion 452 does not move downward. That is, the lock portion 452 is held at this position.

In this situation, by pushing the button portion 460D (i.e., by performing the second operation), and pulling up the headrest 400, the headrest stay 402 can be pulled out of the headrest support 450, that is, the headrest 400 can be removed.

Figure 21A:
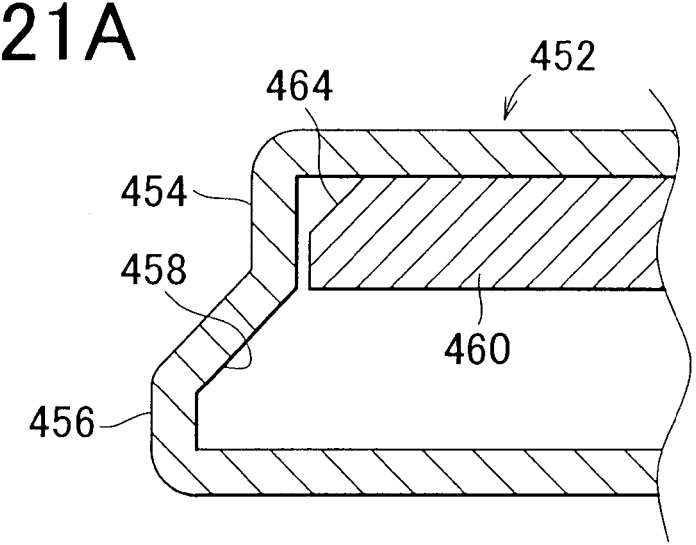
FIGS. 21A to 21C are diagrams showing the situation where an engagement member is moved by pulling up the lock portion of the headrest support, in the order of FIGS. 21A to 21C.
Figure 21B:
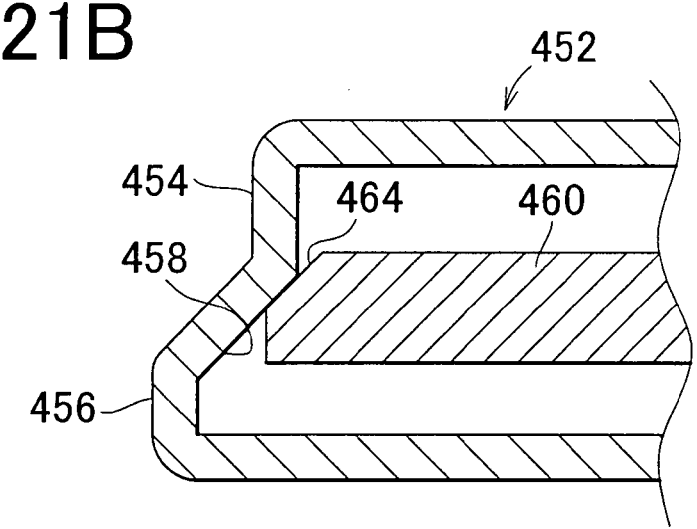
Figure 21C:
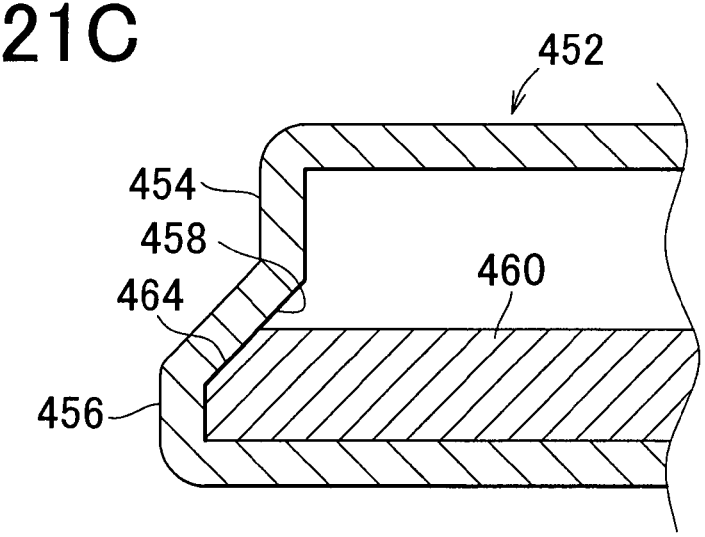

To remount the headrest 400 the lock portion 452 of the headrest support 450 is pulled up. In addition, the button portion 460D pushed, and the headrest stay 402 is inserted into the headrest support 450. Then, the lock portion 452 is pushed downward. As a result, as shown in FIGS. 21C to 21A in the stated order, the engagement member 460 moves from the bottom chamber 456 to the top chamber 454. The engagement member 460 moves toward the spring 472 while the inclined surface 464 of the engagement member 460 moves along the inclined surface 458 of the lock portion 452. In this manner, the headrest 400 may be remounted.

As described above, in the headrest mechanism according to this embodiment, as shown in FIGS. 18 and 19, the headrest stay 402 cannot be pulled out of the headrest support 450; that is, the headrest 400 cannot be removed when the adjustment operation for adjusting the height of the headrest 400 is performed, that is, when the button portion 460D is pushed in the direction shown by the arrow S1.

However, as shown in FIGS. 20A and 20B, when the lock portion 452 of the headrest support 450 is pulled up (i.e., the pullout operation is performed), the engagement member 460 moves, and the second engagement portion 463 disengages from the pullout prevention step 406A. Thus, the headrest stay 402 can be pulled out of the headrest support 450, that is, the headrest 400 can be removed.

Thus, in the headrest mechanism according to this embodiment, the headrest stay 402 can be pulled out of the headrest support 450 only when the pullout operation is performed. The pullout operation differs from the adjustment operation for adjusting the height of the headrest 400. This prevents the headrest stay 402 from being easily pulled out. In addition, the headrest stay 402 can be pulled out of the headrest support 450 without using any additional tools or special equipment.

Next, a fifth embodiment of the invention will be described.

Figure 22:
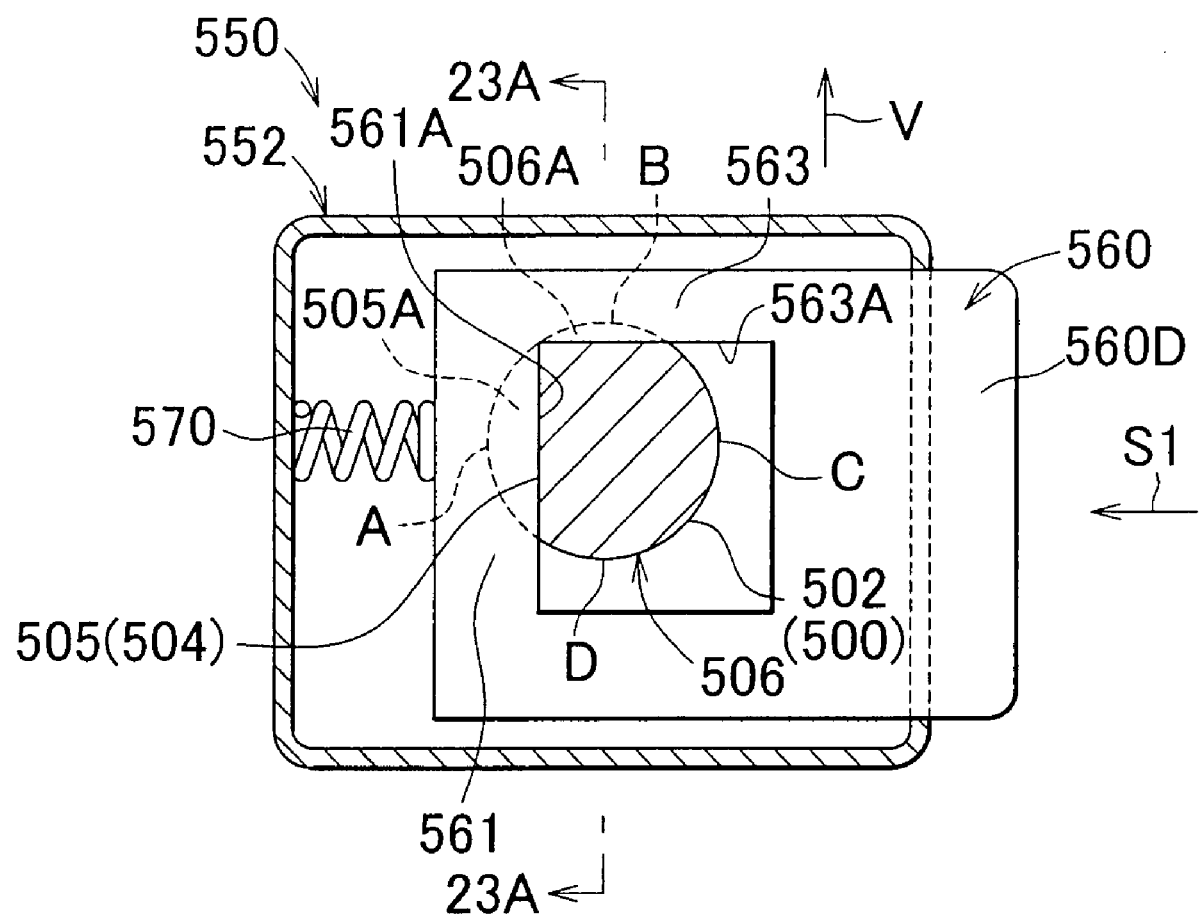
FIG. 22 is a plan view showing a headrest mechanism according to a fifth embodiment of the invention.

As shown in FIG. 22, a plurality of adjustment grooves 504 and an adjustment groove 505 are arranged in the vertical direction on the side surface A of the headrest stay 502 of the headrest 500. The adjustment grooves 504 and the lowest adjustment groove 505 are similar to those in the embodiments that have been described. Therefore, the description thereof will be omitted.

Figure 23A:
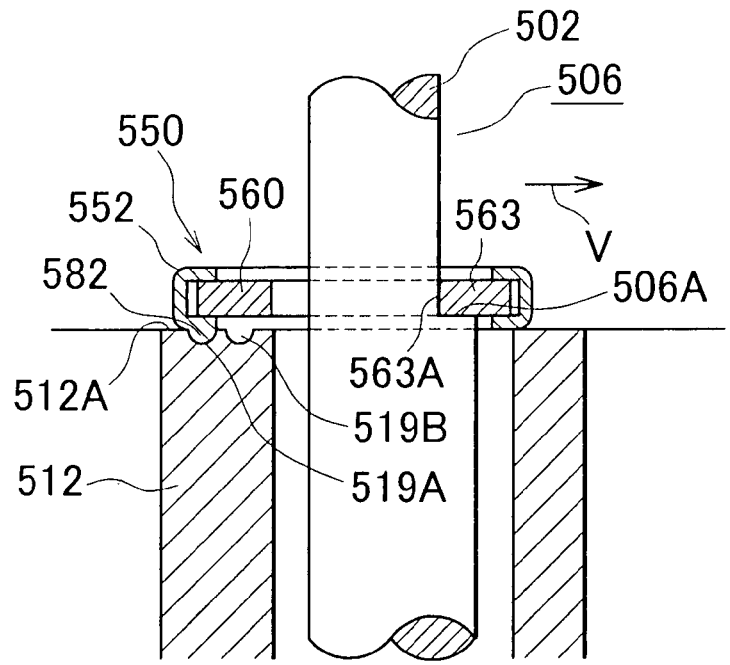
FIGS. 23A and 23B are longitudinal cross sectional views showing the headrest mechanism according to the fifth embodiment of the invention.
Figure 23B:
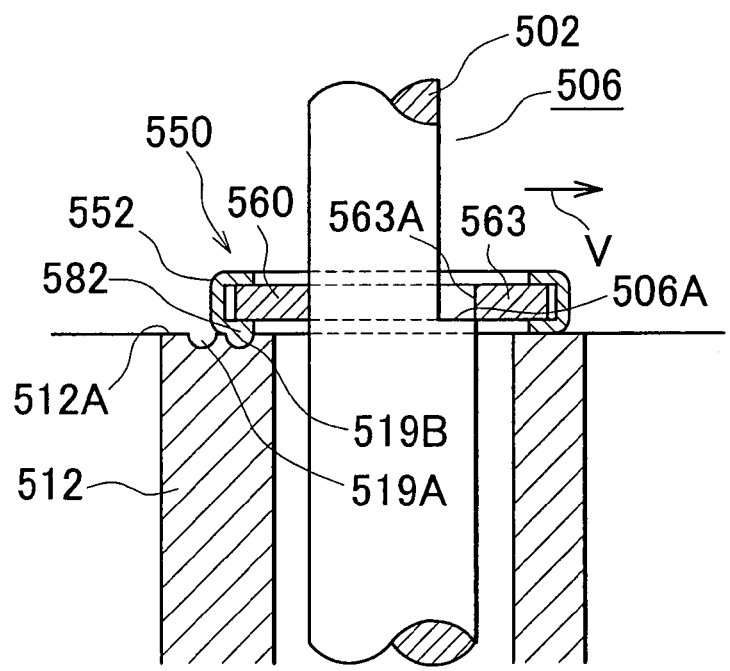

FIGS. 23A and 23B are cross sectional views taken along line 23A-23A in FIG. 22. As shown in FIGS. 23A and 23B, a cutoff portion 506 is formed by cutting off the upper portion of the side surface B of the headrest stay 502. A step is formed at the bottom end of the cutoff portion 506. The step is used to prevent the headrest stay 502 from being pulled out. Thus, the step will be referred to as "pullout prevention step 506A".

As shown in FIG. 22, an engagement member 560 is provided in the lock portion 552 of the headrest support 550. The engagement member 560 has a rectangular frame shape. The headrest stay 502 extends through the hole of the engagement member 560.

A spring 570 presses the engagement member 560 in the direction from the side surface A to the side surface C of the headrest stay 502. That is, the inner surface 561A of the first engagement portion 561 of the engagement member 560 is pressed against one of the adjustment grooves 504 (or the adjustment groove 505) on the side surface A of the headrest stay 502. The inner surface 561A is on the side of the spring 570. Further, the inner surface 563A of the second engagement portion 563 of the engagement member 560 contacts the cutoff portion 506 on the side surface B of the headrest stay 502. The engagement member 560 includes a button portion 560D formed on the side opposite the spring 570. The button portion 560D outwardly protrudes from the lock portion 552.

As shown in FIGS. 23A and 23B, a protrusion 582 is formed in the area of the bottom surface of the lock portion 552 on the side opposite the second engagement portion 563. The protrusion 582 has a semicircular cross section.

A first engagement hole 519A is formed in the area of the top surface 512A of the support portion 512, which faces of the bottom surface of the lock portion 552 on the side opposite the second engagement portion 563. The protrusion 582 engages with the first engagement hole 519A. Further, a second engagement hole 519B is formed on the inner side of the first engagement hole 519 (i.e., on the side of the headrest stay 502). The protrusion 582 may engage with the second engagement hole 519B.

The entire lock portion 552 of the headrest support 550 may slide in the direction shown by the arrow V (refer also to FIG. 22). The direction shown by the arrow V crosses the direction shown by the arrow S1, in which the button portion 506D of the engagement member 560 is pushed (in this embodiment, the direction shown by the arrow V is orthogonal to the direction shown by the arrow S1. The direction shown by the arrow V is the same as the direction shown by the arrow F).

Next, the effects obtained in this embodiment will be described.

The height of the headrest 500 can be adjusted when the button portion 560D of the engagement member 560 is pushed in the direction shown by the arrow S1. The adjustment operation in this embodiment is substantially similar to those in the embodiments that have been described. Therefore, the detailed description thereof will be omitted.

Next, the pullout operation for pulling out the headrest stay 502 to remove the headrest 500 will be described.

As shown in FIG. 22 and FIG. 23A, the second engagement portion 563 of the engagement member 560 engages with the pullout prevention step 506A. Accordingly, the headrest 500 cannot be pulled up any further.

However, as shown in FIG. 23B, when the entire lock portion 552 is slid in the direction shown by the arrow V (i.e., the first operation is performed), the engagement member 560 also slides, and the engagement member 560 disengages from the pullout prevention step 506A. When the lock portion 552 is slid, the protrusion 582 disengages from the first engagement hole 519A, and engages with the second engagement hole 519B. Thus, the lock portion 552 is held at this position.

In this situation, by pushing the button portion 560D (i.e., by performing the second operation), and pulling up the headrest 500, the headrest stay 502 can be pulled out of the headrest support 550.

To remount the headrest 500 the button portion 560D is kept pushed, and the headrest stay 502 is inserted into the headrest support 550. Then, the lock portion 552 of the headrest support 550 is slid in the direction opposite the arrow V. In this manner, the headrest 500 may be remounted.

As described above, in the headrest mechanism according to this embodiment, as shown in FIG. 22, the headrest support 550 cannot be pulled out of the headrest support 550, that is, the headrest 500 cannot be removed when the adjustment operation for adjusting the height of the headrest 500 is performed, that is, when the button portion 560D is pushed in the direction shown by the arrow S1.

However, as shown in FIGS. 23A and 23B, when the lock portion 552 of the headrest support 550 is slid in the direction shown by the arrow V (i.e., the pullout operation is performed), the engagement member 560 slides, and the second engagement portion 563 disengages from the pullout prevention step 506A. Thus, the headrest stay 502 can be pulled out of the headrest support 550, that is, the headrest 500 can be removed.

Thus, in the headrest mechanism according to this embodiment, the headrest stay 502 can be pulled out of the headrest support 550 only when the pullout operation is performed. The pullout operation differs from the adjustment operation for adjusting the height of the headrest 500. This prevents the headrest stay 502 from being easily pulled out. In addition, the headrest stay 502 can be pulled out of the headrest support 550 by the direct operations without using any additional tools or special equipment.

Next, a sixth embodiment of the invention will be described.

The headrest stay 602 provided in the headrest 600 is similar to that in the fifth embodiment. Therefore, the description thereof will be omitted. FIGS. 25A and 25B are cross sectional views taken along line 25A-25A in FIG. 24.

Figure 24:
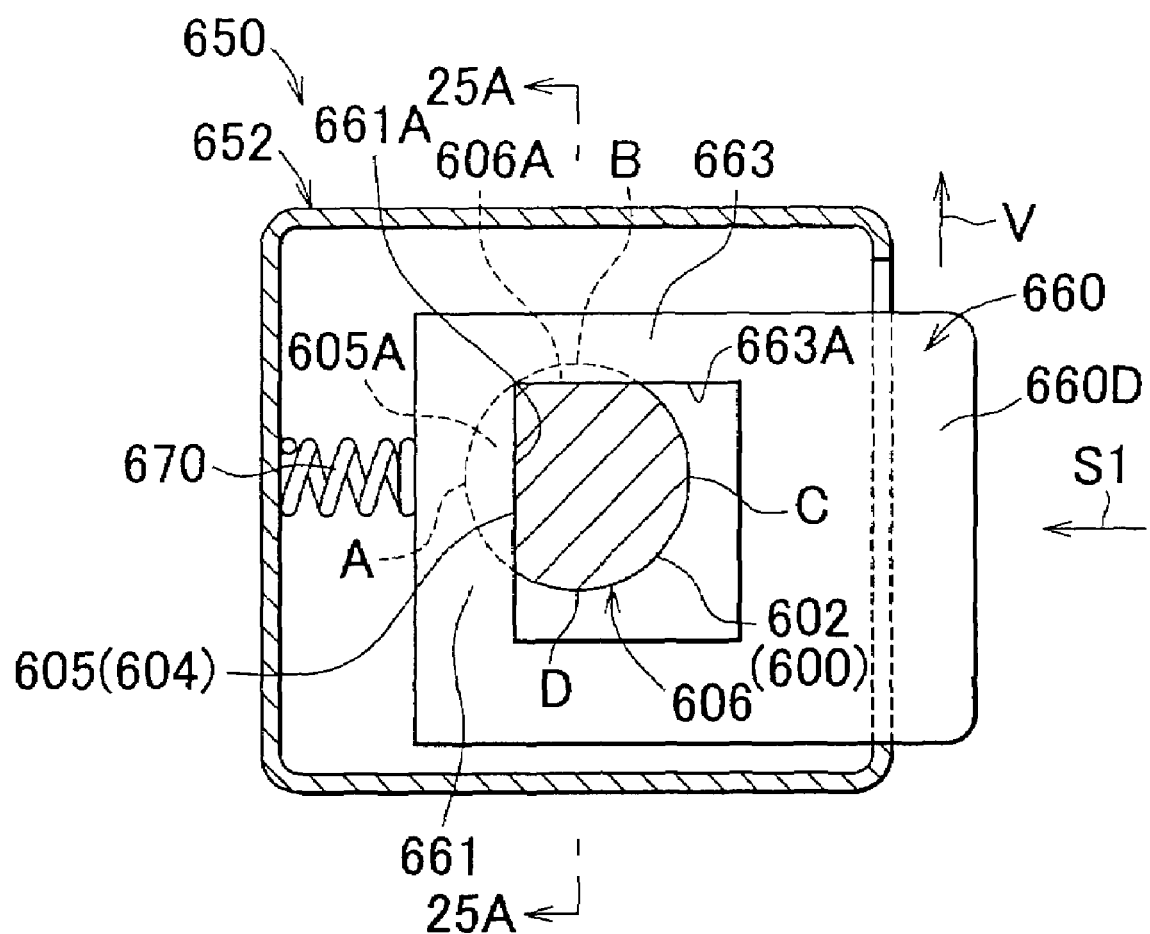
FIG. 24 is a plan view showing a headrest mechanism according to a sixth embodiment of the invention.
Figure 25A:
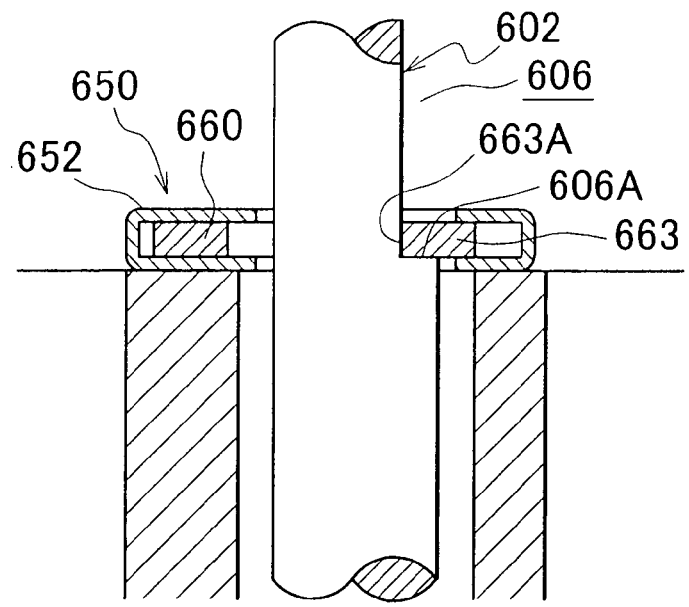
FIGS. 25A and 25B are longitudinal cross sectional views showing the headrest mechanism according to the sixth embodiment of the invention.
Figure 25B:
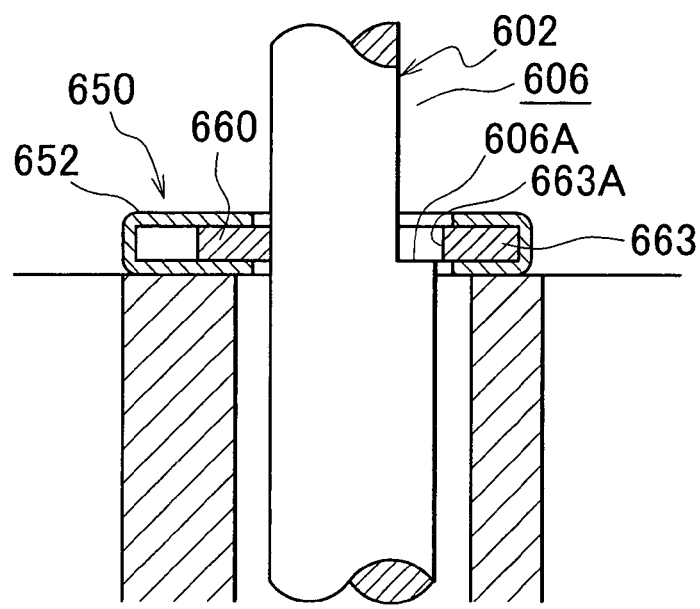

As shown in FIG. 24, an engagement member 660 is provided in the lock portion 652 of the headrest support 650. The engagement member 660 has a rectangular frame shape. The headrest stay 602 extends through the hole of the engagement member 660.

A spring 670 presses the engagement member 660 in the direction from the side surface A to the side surface C of the headrest stay 602. That is, the inner surface 661A of the first engagement portion 661 of the engagement member 660 is pressed against one of the adjustment grooves 604 (or the adjustment groove 605) on the side surface A of the headrest stay 602. The inner surface 661A is on the side of the spring 670. Further, the inner surface 663A of the second engagement portion 663 of the engagement member 660 contacts the cutoff portion 606 on the side surface B of the headrest stay 602. The engagement portion 660 includes a button portion 660D formed on the side opposite the spring 670. The button portion 660D outwardly protrudes from the lock portion 652.

Further, the entire engagement member 660 may slide in the direction shown by the arrow V (i.e., the direction from the side surface D to the side surface B of the headrest stay 602). The direction shown by the arrow V crosses the direction shown by the arrow S1, in which the button portion 660D of the engagement member 660 is pushed (in this embodiment, the direction shown by the arrow V is orthogonal to the direction shown by the arrow S1. The direction shown by the arrow V is the same as the direction shown by the arrow F).

Next, the effects obtained in this embodiment will be described.

The height of the headrest 600 can be adjusted when the button portion 660D of the engagement member 660 is pushed in the direction shown by the arrow S1. The adjustment operation in this embodiment is substantially similar to those in the embodiments that have been described. Therefore, the detailed description thereof will be omitted.

Next, the pullout operation for pulling out the headrest stay 602 to remove the headrest 600 will be described.

As shown in FIG. 24 and FIG. 25A, the second engagement portion 663 of the engagement member 660 engages with the pullout prevention step 606A. Accordingly, the headrest stay 602 cannot be pulled up any further.

However, as shown in FIG. 25B, when the button portion 660D of the engagement member 660 is slid in the direction shown by the arrow V (i.e., the first operation is performed), that is, when the entire engagement member 660 is slid in the direction shown by the arrow V, the second engagement portion 663 disengages from the pullout prevention step 606A.

In this situation, by pushing the button portion 660D in the direction shown by the arrow S1 (i.e., by performing the second operation), and pulling up the headrest 600, the headrest stay 602 can be pulled out of the headrest support 650, that is, the headrest 600 can be removed.

To remount the headrest 600 the entire engagement member 660 is slid in the direction shown by the arrow V, and the button portion 660D is pushed in the direction shown by the arrow S1. In this situation, the headrest stay 602 is inserted into the headrest support 650, and then the button portion 660D is slid in the direction opposite the arrow V. In this manner, the headrest 600 may be remounted.

As described above, in the headrest mechanism according to this embodiment, as shown in FIG. 24, the headrest stay 602 cannot be pulled out of the headrest support 650, that is, the headrest 600 cannot be removed when the adjustment operation for adjusting the height of the headrest 600 is performed, that is, when the button portion 660D is pushed in the direction shown by the arrow S1.

However, as shown in FIG. 25A and FIG. 25B, when the button portion 660D is slid in the direction shown by the arrow V (i.e., the pullout operation is performed), the engagement member 660 slides, and the second engagement portion 663 disengages from the pullout prevention step 606A. Thus, the headrest stay 602 can be pulled out of the headrest support 650, that is, the headrest 600 can be removed.

Thus, in the headrest mechanism according to this embodiment, only when the pullout operation is performed, the headrest stay 602 can be pulled out of the headrest support 650. The pullout operation differs from the adjustment operation for adjusting the height of the headrest 600. This prevents the headrest stay 602 from being easily pulled out. In addition, the headrest stay 602 can be pulled out by the direct operations, without using any additional tools or special equipment.

The invention is not limited to the above-described embodiments.

For example, although the adjustment grooves, that is, concave portions are formed on the side surface of the headrest stay in each of the above-described embodiments, convex portions may be formed. Instead of the pullout prevention step, a convex portion may be formed.

What is claimed is:

1. A headrest mechanism, comprising:
a headrest stay provided in a headrest;
a headrest support, the headrest support comprising a locking portion, wherein the headrest stay is inserted into, and pulled out of the headrest support, a height of the headrest is adjusted by moving the headrest stay, and an adjustment operation and a pullout operation are performed in the headrest support;
an engagement member, provided in the headrest support;
a plurality of adjustment portions provided in the headrest stay, wherein movement of the headrest stay is prevented by engagement of the engagement member with one of the plurality of adjustment portions, and the engagement member disengages from the one of the plurality of adjustment portions when the adjustment operation is performed in the headrest support to allow the headrest stay to move; and
a pullout prevention portion provided in the headrest stay, wherein the headrest stay is prevented from being pulled out by engagement of the engagement member with the pullout prevention portion, and the engagement of the engagement member is prohibited only when the pullout operation is performed in the headrest support to allow the headrest stay to be pulled out,
wherein:
the pullout operation includes a first operation and a second operation;
the engagement member further comprises a first engagement portion and a second engagement portion;
movement of the headrest stay is prevented by engagement of the first engagement portion with one of the plurality of adjustment portions provided in the headrest stay;
the headrest stay is prevented from being pulled out by engagement of the second engagement portion with the pullout prevention portion provided in the headrest stay;

when the adjustment operation is performed in the headrest support, the first engagement portion disengages from the one of the plurality of adjustment portions to allow the headrest stay to move;

when the first operation of the pullout operation is performed in the headrest support, the second engagement portion disengages from the pullout prevention portion, and the first engagement portion engages with the pullout prevention portion;

when the second operation of the pullout operation is performed in the headrest support, the first engagement portion disengages from the pullout prevention portion to allow the headrest stay to be pulled out; and the first operation of the pullout operation comprises rotating the locking portion of the headrest support from a first position to a second position.

2. The headrest mechanism according to claim 1, wherein the pullout operation in the headrest support can only be performed when the height of the headrest is equal to a predetermined height.

3. The headrest mechanism according to claim 1, wherein the headrest support includes a pullout operation portion by which the pullout operation is performed, and a prevention portion that prevents the pullout operation from being performed using the pullout operation portion.

4. The headrest mechanism according to claim 1, wherein the headrest support includes a movable portion that is moved in the pullout operation.

5. The headrest mechanism according to claim 4, wherein the engagement member is disengaged from the pullout prevention portion by moving the movable portion.

6. The headrest mechanism according to claim 5, wherein the engagement member includes a pivot portion that pivots by moving the movable portion.

7. The headrest mechanism according to claim 6, wherein:
the plurality of adjustment portions is a plurality of grooves formed in the headrest stay;
the pullout prevention is a step formed in the headrest stay; and
the plurality of grooves is formed on a side surface of the headrest stay that differs from a side surface of the headrest stay on which the step is formed.

8. The headrest mechanism according to claim 5, wherein the engagement member is provided in the headrest support, and the engagement member is moved by moving the movable portion.

9. The headrest mechanism according to claim 8, wherein:
the plurality of adjustment portions is a plurality of grooves formed in the headrest stay;
the pullout prevention is a step formed in the headrest stay; and
the plurality of grooves is formed on a side surface of the headrest stay that differs from a side surface of the headrest stay on which the step is formed.

10. The headrest mechanism according to claim 8, wherein the movable portion is slid.

11. The headrest mechanism according to claim 10, wherein the movable portion is moved in a vertical direction.

12. The headrest mechanism according to claim 10, wherein the movable portion is moved in a horizontal direction.

13. The headrest mechanism according to claim 1, wherein:
the plurality of adjustment portions is a plurality of grooves formed in the headrest stay;
the pullout prevention portion is a step formed in the headrest stay; and
the plurality of grooves is formed on a side surface of the headrest stay that differs from a side surface of the headrest stay on which the step is formed.

14. The headrest mechanism according to claim 1, wherein:
the plurality of adjustment portions is a plurality of grooves formed in the headrest stay;
the pullout prevention portion is a step formed in the headrest stay; and
the plurality of grooves is formed on a side surface of the headrest stay that differs from a side surface of the headrest stay on which the step is formed.

15. A headrest mechanism, comprising:
a headrest stay provided in a headrest;
a headrest support, the headrest support comprising a locking portion, wherein the headrest stay is inserted into, and pulled out of the headrest support, a height of the headrest is adjusted by moving the headrest stay, and an adjustment operation and a pullout operation are performed in the headrest support;
engagement means provided in the headrest support;
a plurality of adjustment portions provided in the headrest stay, wherein movement of the headrest stay is prevented by engagement of the engagement means with one of the plurality of adjustment portions, and the engagement means disengages from the one of the plurality of adjustment portions when the adjustment operation is performed in the headrest support to allow the headrest stay to move; and
a pullout prevention portion provided in the headrest stay, wherein the headrest stay is prevented from being pulled out by engagement of the engagement means with the pullout prevention portion, and the engagement of the engagement means is prohibited only when the pullout operation is performed in the headrest support to allow the headrest stay to be pulled out,
wherein:
the pullout operation includes a first operation and a second operation;
the engagement means further comprises a first engagement portion and a second engagement portion; and
movement of the headrest stay is prevented by engagement of the first engagement portion with one of the plurality of adjustment portions provided in the headrest stay;
the headrest stay is prevented from being pulled out by engagement of the second engagement portion with the pullout prevention portion provided in the headrest stay;
when the adjustment operation is performed in the headrest support, the first engagement portion disengages from the one of the plurality of adjustment portions to allow the headrest stay to move;
when the first operation of the pullout operation is performed in the headrest support, the second engagement portion disengages from the pullout prevention portion, and the first engagement portion engages with the pullout prevention portion;
when the second operation of the pullout operation is performed in the headrest support, the first engagement portion disengages from the pullout prevention portion to allow the headrest stay to be pulled out; and
the first operation of the pullout operation comprises rotating the locking portion of the headrest support from a first position to a second position.

* * * * *